United States Patent
Molnar et al.

(10) Patent No.: US 6,411,932 B1
(45) Date of Patent: Jun. 25, 2002

(54) RULE-BASED LEARNING OF WORD PRONUNCIATIONS FROM TRAINING CORPORA

(75) Inventors: Lajos Molnar, Dallas, TX (US); Charles T. Hemphill, Redmond, WA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/328,129

(22) Filed: Jun. 8, 1999

(Under 37 CFR 1.47)

Related U.S. Application Data

(60) Provisional application No. 60/089,036, filed on Jun. 12, 1998.

(51) Int. Cl.$^7$ .............................................. G10L 13/08
(52) U.S. Cl. ...................................... 704/260; 704/254
(58) Field of Search ................................. 704/260, 254, 704/251, 258, 257, 255, 266, 231, 200, 252, 268

(56) References Cited

U.S. PATENT DOCUMENTS

| | | | | |
|---|---|---|---|---|
| 5,040,218 A | * | 8/1991 | Vitale et al. ................... 381/52 |
| 6,016,471 A | * | 1/2000 | Kuhn et al. ................... 704/266 |
| 6,018,736 A | * | 1/2000 | Gilai et al. ..................... 707/6 |
| 6,029,132 A | * | 2/2000 | Kuhn et al. ................... 704/258 |
| 6,092,044 A | * | 7/2000 | Baker et al. .................. 704/254 |
| 6,120,297 A | * | 9/2000 | Morse, III et al. ........... 434/169 |
| 6,272,464 B1 | * | 8/2001 | Kiraz et al. ................... 704/231 |
| 6,314,165 B1 | * | 11/2001 | Junqua et al. ............... 704/258 |

OTHER PUBLICATIONS

Eric Brill "Transformation–Based Error–Driven Parsing"— pages 1–13.
Caroline B. Huang, Mark A. Son–Bell, David M. Baggett "Generation Of Pronunciations From Orthographies Using Transformation–Based Error–Driven Learning".
Lidia Mangu and Eric Brill "Automatic Rule Acquisition For Spelling Correction".
Eric Brill "Transformation–Based Error–Driven Learning And Natural Language Processing: A Case Study In Part Of Speech Tagging".
Eric Brill Unsupervised Learning of Disambiguation Rules for Part of Speech Tagging.
Eric Brill "Automatic Grammar Induct ion and Parsing Free Text: A Transformation–Based Approach".

* cited by examiner

*Primary Examiner*—Richemond Dorvil
(74) *Attorney, Agent, or Firm*—Robert L. Troike; Frederick J. Telecky, Jr.

(57) ABSTRACT

A text-to-pronunciation system (11) includes a large training set of word pronunciations (19) and an extractor for extracting language specific information from the training set to produce pronunciations for words not in its training set. A learner (13) forms pronunciation guesses for words in the training set and for finding a transformation rule that improves the guesses. A rule applier (15) applies the transformation rule found to guesses. The learner (13) repeats the finding of another rule and the rule applier (15) applies the new rule to find the rules that improves the guesses the most.

18 Claims, 10 Drawing Sheets

FIG. 1A

| Criteria | Dictionary | Simple Context-based | Rule-based transliterator | Transform. based Error-driven Learner | Parsing Word Morphology | Overlapping Chunks | Neural Networks |
|---|---|---|---|---|---|---|---|
| Pronunciation Learning | | | | | | | |
| Space requirements | N/A[16] | N/A[16] | N/A[16] | Huge[1] | Large[2] | N/A[16] | Moderate[3] |
| Time complexity | Human, months | Human, 3-5 days | Human, 3-5 days | 1-5 days | N/D[17] | N/A[16] | N/D[17] |
| Automatic | No[4] | No[5] | No[5] | Yes | Yes | Yes | Yes |
| Language Independent | N/A[16] | No | No | Yes | Yes | Yes | Yes[6] |
| Information needed | WP[7] | PR[8], and PhR[9] | PR[8], and PhR[9] | PhGM[10], WP[7], PhQ[13] | PhGA[11] and Morph[12] | WP[7] | WP[7], PhQ[13] |
| Pronunciation Generation | | | | | | | |
| Memory requirements | Negligible | Tiny (1-2K) | Tiny (1-3K) | Small (5-15K) | Large (100K-1M) | Large(1-3M)[14] | Large (100K-1M) |
| Disk space requirements | 1-2MB (for dictionary) | 1-2KB | 1-3KB | Small (5-15K) | 100K-1M | 1-2MB (for dictionary) | 100K-1M |
| Time complexity | $O(1)$ | $O(N_{rules})$ | $O(N_{rules})$ | $O(N_{rules})$ | $O(N_{letters})$ | $O(N^4_{letters})$[15] | $O(1/2N_{letters}$ $(N_{phones}+N_{letters}))$ |
| Performance | English | English | English (no proper names) | English | English (Brown corpus) | English(also pseudo-words) | English (surnames) |
| Phoneme accuracy [%] | | | | | | | |
| Learning set | 100 | N/A[16] | N/A[16] | N/D[17] | 94.2 | N/A[16] | N/D[17] |
| Test set | 0 | 76.4 | 90 | 88 | 91.7 | 91.7 | N/D[17] |
| Word accuracy [%] | | | | | | | |
| Learning set | 100 | N/A[16] | N/A[16] | N/D[17] | 77.3 | N/A[16] | 54.1 |
| Test set | 0 | 27.8 | N/D[17] | N/D[17] | 69.3 | 56.6 | 44.3 |

1 10-300 MB, if optimized for speed
2 1-4 MB, mostly probabilistic information (estimate)
3 200-700 KB, mostly activation values and data for the backpropagation algorithm (estimate)
4 human transcription is needed
5 human experts are needed
6 although neural network will have different structure
7 WP: word pronunciations
8 PR: language-specific pronunciation rules
9 PhR: language-specific phonological rules
10 PhGM: basic phoneme-grapheme mappings
11 PhGA: basic phoneme-grapheme alignments
12 Morph: morphological analysis
13 PhQ: phonetic feature description of phonemes
14 For dictionary only. More, if optimized for speed
15 if optimized for speed
16 N/A: Not applicable
17 N/D: Data not available

FIG. 1B

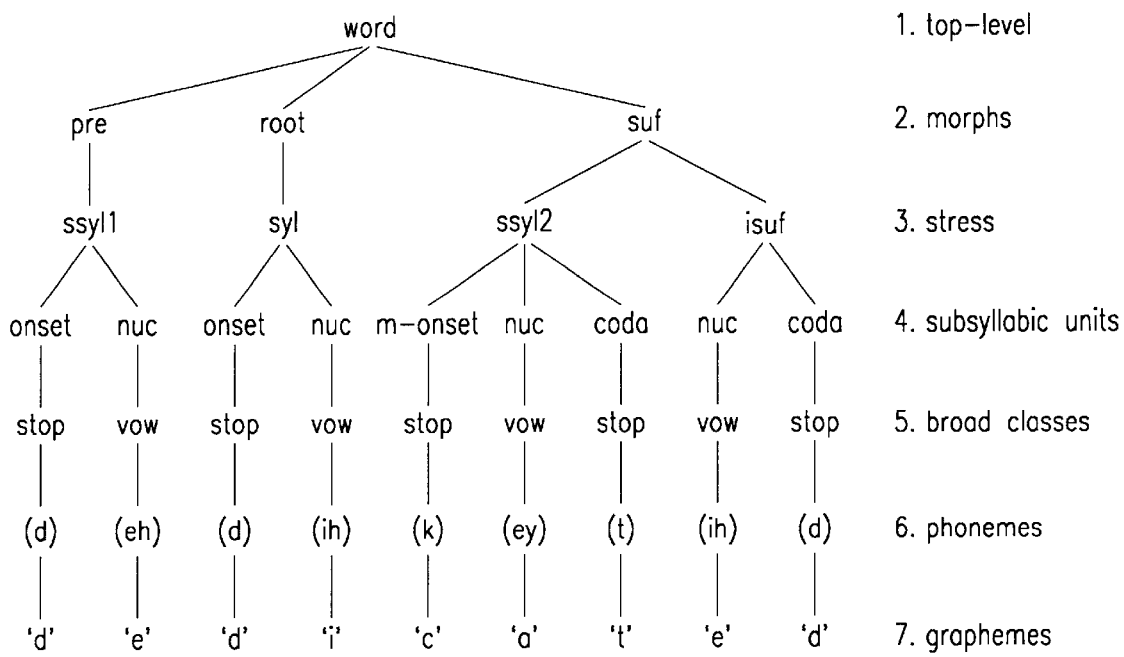

FIG. 2

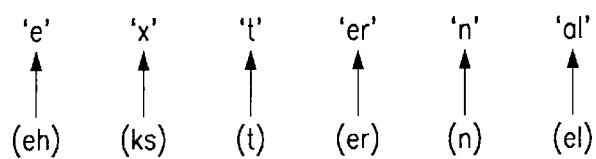
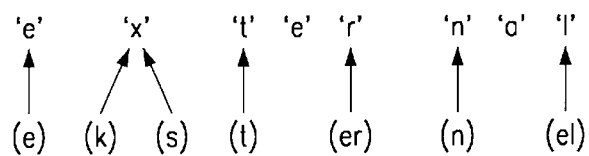
FIG. 11
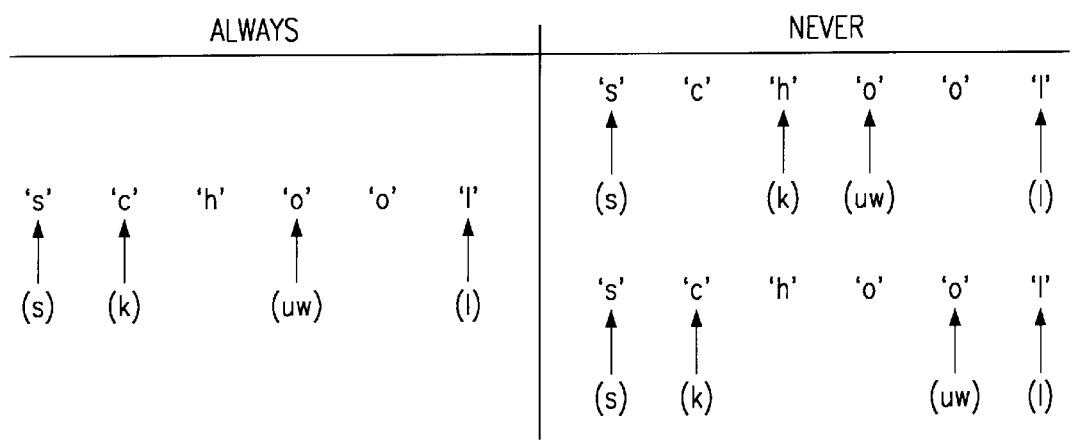
FIG. 12
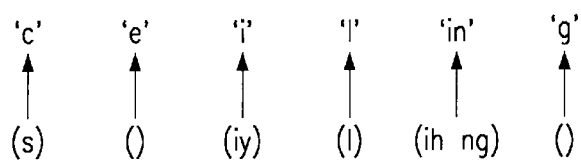
FIG. 13

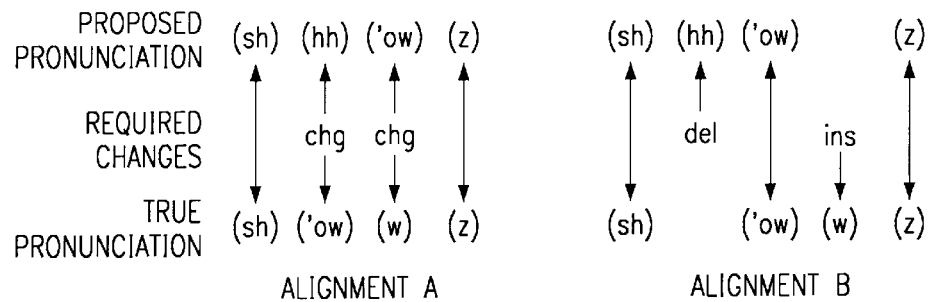
FIG. 18
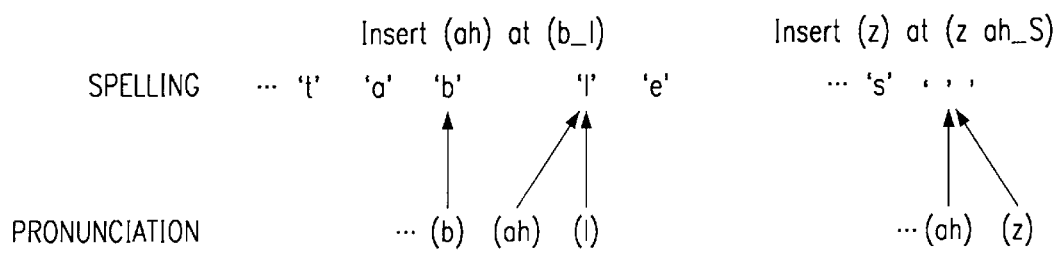
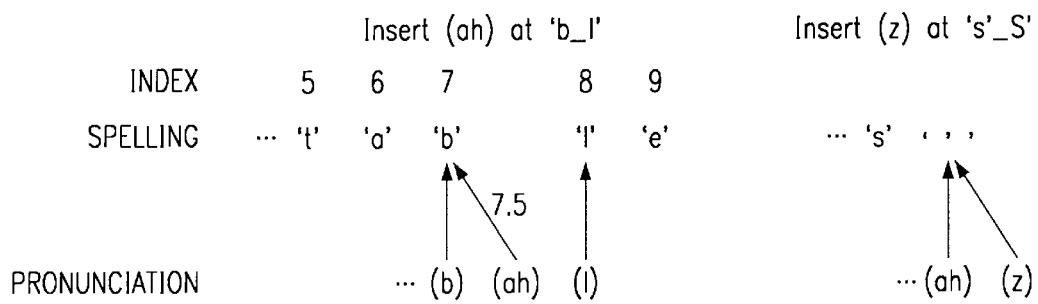
FIG. 19
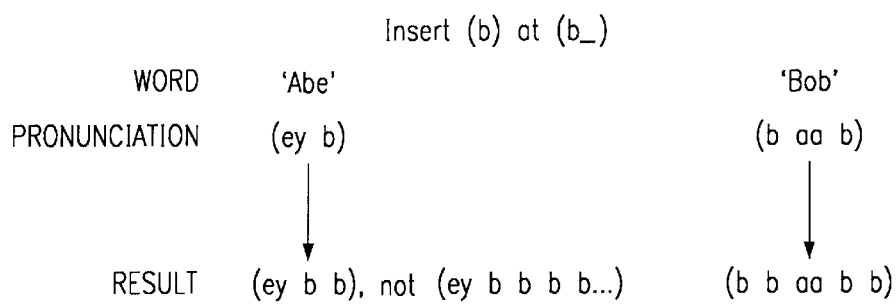
FIG. 20

FIG. 22

| | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| Phoneme accuracy (test set) | 76.9 | 76.7 | 77.0 | 76.8 | 73.9 | 77.1 | 74.0 | 73.9 | 77.8 | 77.3 | 76.3 | 77.0 | 76.9 | 78.1 | 77.1 | 76.9 | 76.7 | 81.9 | 81.0 | 82.9 | 82.8 |
| Word accuracy (test set) | 26.3 | 26.1 | 26.3 | 26.1 | 20.0 | 26.4 | 21.6 | 21.5 | 27.5 | 26.8 | 25.2 | 26.4 | 26.1 | 25.2 | 26.7 | 27.1 | 27.2 | 37.7 | 37.0 | 38.2 | 38.2 |
| Overgeneration | 73.7 | 73.9 | 73.7 | 73.9 | 80.0 | 73.6 | 78.4 | 78.5 | 72.5 | 73.2 | 74.8 | 73.6 | 73.9 | 75.4 | 73.3 | 72.9 | 72.8 | 62.3 | 63.0 | 61.8 | 61.8 |
| Undergeneration | 78.7 | 78.9 | 78.9 | 78.9 | 83.5 | 78.7 | 82.7 | 82.7 | 77.9 | 78.5 | 79.6 | 78.6 | 78.8 | 79.3 | 79.0 | 78.1 | 77.8 | 69.5 | 70.1 | 69.2 | 69.3 |
| Exact word generation | 21.3 | 21.1 | 21.1 | 21.1 | 16.5 | 21.3 | 17.3 | 17.3 | 22.1 | 21.5 | 20.4 | 21.4 | 21.2 | 20.3 | 21.0 | 21.9 | 22.2 | 30.5 | 29.9 | 30.8 | 30.7 |
| Pronunciations per word | 1 | 1 | 1 | 1 | 1 | 1 | 1 | 1 | 1 | 1 | 1 | 1.06 | 1 | 1 | 1 | 1 | 1 | 1 | 1 | 1 | 1 |
| Application percentage | 96.1 | 96.0 | 95.9 | 96.0 | 94.1 | 96.1 | 95.6 | 95.6 | 97.2 | 96.0 | 96.2 | 96.2 | 96.0 | 96.7 | 96.2 | 96.1 | 96.1 | 98.1 | 98.0 | 98.0 | 97.7 |
| Word accuracy (training set) | 49.4 | 49.5 | " | " | 43.8 | 49.5 | 42.1 | 42.1 | 52.1 | 49.5 | 49.3 | 50.1 | 49.9 | 42.4 | 49.1 | 51.4 | 51.7 | 97.7 | 97.8 | 97.7 | 99.7 |
| Phoneme accuracy (training set) | 86.5 | 86.6 | " | " | 85.3 | 86.6 | 83.8 | 83.8 | 87.8 | 86.7 | 86.6 | 86.9 | 86.6 | 84.3 | 86.5 | 87.0 | 87.0 | 99.6 | 99.6 | 99.6 | 100.0 |
| Number of rules | 377 | 381 | " | " | 449 | 381 | 497 | 495 | 399 | 378 | 394 | 385 | 383 | 432 | 362 | 375 | 371 | 712 | 697 | 784 | 792 |
| Compound phonemes | none | none | none | none | none | none | none | none | none | none | none | yes | none | none | none | none | none | none | none | none | none |
| Alignment | static | static | static | static | static | dyn. | dyn. | dyn. | dyn. | dyn. | dyn. | dyn. | dyn. | dyn. | dyn. | dyn. | dyn. | dyn. | dyn. | dyn. | dyn. |
| Feature-phonemes[3] | none | none | none | none | none | none | none | none | none | none | none | v | V/C | v,V/C | V/C | v,V/C | none | none | none | none | none |
| Case sensitivity | no | yes | rules | initial | no | no | no | no | no | no | no | no | no | no | no | no | no | no | no | no | no |
| Initial guess[2] | non-E | non-E | non-E | non-E | empty | non-E | non-E | non-E | non-E | non-E | non-E | non-E | non-E | non-E | non-E | non-E | non-E | non-E | non-E | non-E | non-E |
| Maximum Context length | 1 | 1 | 1 | 1 | 1 | 1 | 1 | 1 | 1 | 1 | 1 | 1 | 1 | 1 | 1 | 1 | 1 | 2 | 2 | 2 | 3 |
| Features in alignment[1] | vfhpsr | vfhpsr | vfhpsr | vfhpsr | vfhpsr | vfhpsr | none | s,c,n,r | v,f,h,p | v,f,h | v,p | v,f | vfhpsncr | vfhpsr | vfhpsr | vfhpsr | vfhpsr | vfhpsr | vfhpsr | vfhpsr | vfhpsr |

RULE-BASED LEARNING OF WORD PRONUNCIATIONS FROM TRAINING CORPORA

This application claims priority under 35 USC § 119(e)(1) of provisional application No. 60/089,036, filed Jun. 12, 1998.

FIELD OF THE INVENTION

This invention relates to text-to-pronunciation systems and more particularly to rule-based learning of word pronunciations from training corpora or set of pronunciations.

BACKGROUND OF THE INVENTION

In this document we will frequently refer to phonemes and graphemes (letters). Graphemes are enclosed in single quotation marks (e.g. 'abc'). In fact, any symbol(s) within single quotation marks refer to graphemes, or grapheme sequences.

Phonemes or phoneme sequences are enclosed in parentheses; ('m uw). We Will use the ASCII representation for the English phoneme set. See Charles T. Hemphill, *EPHOD, Electronic PHOnetic Dictionary*, Texas Instruments, Dallas, Tex., USA, Edition 1.1, May 12, 1995. Stress levels are usually not marked in most examples, as they are not important to the discussion. In fact, we will assume that the stress information directly belongs to the vowels, so the above phoneme sequence will be denoted as (m 'uw) or simply (m uw). Schwas are represented either as unstressed vowels (.ah) or using their special symbol (ax) or (.ax).

Grapheme-phoneme correspondences (partial or whole pronunciations) are represented by connecting the graphemes to the phoneme sequence (e.g. 'word'→(w er d)). The grapheme-phoneme correspondences usually do not contain stress marks.

Grapheme or phoneme contexts are represented by listing the left and right contexts, and representing the symbol of interest with an underscore (e.g. (b__1)). Word boundaries in contexts are denoted with a dollar sign (e.g. '$x__').

In this decade, speech as a medium is becoming a more prevalent component in consumer computing. Games, office productivity and entertainment products use speech as a natural extension to visual interfaces. Some programs use prerecorded digital audio files to produce speech, while other programs use speech synthesis systems. The advantage of the latter system is that they can generate a broad range of sentences, and thus, they can be used for presenting dynamic information. Nevertheless, their speech quality is usually lower than that of prerecorded audio segments.

Speech recognition systems are also becoming more and more accessible to average consumers. A drawback of these systems is that speech recognition is a computationally expensive process and requires a large amount of memory; nonetheless, powerful computers are becoming available for everyday people.

Both speech synthesis and speech recognition rely on the availability of pronunciations for words or phrases. Earlier systems used pronunciation dictionaries to store word pronunciations. However, it is possible to generate word pronunciations from language-specific pronunciation rules. In fact, systems starting from the early stages have been using algorithms to generate pronunciations for words not in their pronunciation dictionary. Also, since pronunciation dictionaries tend to be large, it would be reasonable to store pronunciations only for words that are difficult to pronounce, namely, for words that the pronunciation generator cannot correctly pronounce.

Speech recognizers are becoming an important element of communication systems. These recognizers often have to recognize arbitrary phrases, especially when the information to be recognized is from an on-line, dynamic source. To make this possible, the recognizer has to be able to produce pronunciations for arbitrary words. Because of space requirements, speech systems need a compact yet robust method to make up word pronunciations.

There are a myriad of approaches that have been proposed for text-to-pronunciation (TTP) systems. In addition to using a simple pronunciation dictionary, most systems use rewrite rules which have proven to be quite well-adapted to the task at hand. Unfortunately, these rules are handcrafted; thus, the effort put into producing these rules needs to be repeated when a new language comes into focus. To solve this problem, more recent methods use machine-learning techniques, such as neural networks, decision trees, instance-based learning, Markov models, analogy-based techniques, or data-driven solutions to automatically extract pronunciation information for a specific language. See François Yvon, *Grapheme-to-Phoneme Conversion Using Multiple Unbounded Overlapping Chunks*, PROCEEDINGS OF THE INTERNATIONAL CONFERENCE ON NEW METHODS IN LANGUAGE PROCESSING, No. 2, Ankara, Turkey, 1996. Also in internet address xxx.lanl.gov/list/cmp-lg/9608#cmp-lg/9608006.

A review of some of the approaches follows. It is difficult to objectively compare the performance of these methods, as each is trained and tested using different corpora and different scoring functions. Nevertheless, an overall assessment is presented of each approach.

The simplest way to generate word pronunciations is to store them in a pronunciation dictionary. The advantage of this solution is that the lookup is very fast. In fact, we can have a constant lookup time if we use a hash table. It is also capable of capturing multiple pronunciations for words with no additional complexity. The major drawback of dictionaries is that they cannot seamlessly handle words that are not in them. They also take up a lot of space (O(N), where N is the number of words). O (f(x)) is the mathematical notation for the order of magnitude.

A somewhat more flexible solution is to generate pronunciations for words based on their spelling. In a pronunciation system developed by Advanced Research Projects Agency (ARPA); each letter (grapheme) is pronounced based on its grapheme context. An example for English would be to $$\text{pronounce 'e' in the context '\_r\$' as (er).} \qquad (1.1)$$

The system consists of a set of rules, each containing a letter context and a phoneme sequence (pronunciation) corresponding to the letter of interest underlined. The representation of the above rule (1.1) would be:

$$\text{'\underline{e}r\$'} \rightarrow \text{(er)}. \qquad (1.2)$$

These pronunciation rules are generated by a human expert for the given language. The advantage of this system is that it can produce pronunciations for unknown words; in fact, every word is treated as unknown. Also, this method can encapsulate pronunciation dictionaries, as entire words can be used as contexts. Furthermore, this method can produce multiple pronunciations for words, since the phoneme sequences in the rules can be arbitrary. The disadvantage of the system is that it cannot take advantage of phonetic features; thus, it requires an extensive rule set. Also, a human expert is needed to produce the rules; therefore, it is difficult to switch to a different language. Moreover, it pronounces each letter as a unit, which seems counter-intuitive.

The rule-based transliterator (RBT) uses transformation rules to produce pronunciations. See Caroline B. Huang et al., *Generation of Pronunciations from Orthographies Using Transformation-Based Error-Driven Learning*, INTERNATIONAL CONFERENCE ON SPEECH AND LANGUAGE PROCESSING, pp 411–414, Yokohama, Japan, 1994. It was written in the framework of the theory of phonology by Chomsky and Halle, and it uses phonetic features and phonemes. See Noah Chomsky and M. Halle, *The Sound Pattern of English*, HARPER & Row, New York, New York, USA, 1968. Rewrite rules are formulated as $$\alpha \rightarrow \beta/\gamma\delta \qquad (1.3)$$

which stands for

α is rewritten as β in the context of γ (left) and δ (right).

Here, α, β, γ, and δ can each be either graphemes or phonemes. Each phoneme is portrayed as a feature bundle; thus, rules can refer to the phonetic features of each phoneme. Rewrite rules are generated by human experts, and are applied in a specific order.

This method is similar to the simple context-based ARPA method described above. One improvement is that this system can make use of phonetic features to generalize pronunciation rules. Also, it can capture more complex pronunciation rules because applied rules change the pronunciations which become the context for future rules. The major disadvantage of this solution is that a human expert is still needed to produce the rules; thus, it is difficult to switch to a different language. Another disadvantage is that in contrast with the simple context-based model, this method cannot produce multiple pronunciations for words. Nevertheless, it can be extended to handle multiple pronunciations if we specify how contexts are matched when the phonetic representation is a directed graph and contains multiple pronunciations.

The transformation-based error-driven learner is an extension of the rule-based transliterator. This approach uses similar rewrite rules to produce pronunciations; however, it derives these rules by itself. Also, the context in the rewrite rules can contain corresponding graphemes and phonemes, as this extra information helps the error-driven learner to discover rules.

The learning process consists of the following steps. First, the spelling and the pronunciation (guess) of each word in the training set is aligned with each other. Then, an initial pronunciation is produced for each word. After that, the learner produces transformations that bring the pronunciation guesses closer to the true pronunciations. The most successful transformation is applied to the training set generating a new guess for each word, and then the process is repeated until there are no more transformations that improve the word pronunciations.

This method, based on Eric Brill's part-of-speech tagging system, can achieve very high accuracy. See Eric Brill, *Transformation-Based Error-Driven Learning and Natural Language Processing: A Case Study in Part of Speech Tagging*, PhD Thesis, The Johns Hopkins University, Department of Computer Science, 1995. Also in COMPUTATIONAL LINGUISTICS, December 1995. See Caroline B. Huang et al., *Generation of Pronunciations from Orthographies Using Transformation-Based Error-Driven Learning*, INTERNATIONAL CONFERENCE ON SPEECH AND LANGUAGE PROCESSING, pp 411–414, Yokohama, Japan, 1994. The main advantage of this approach is that it is completely automatic, and it needs only a little knowledge about the language (phoneme-grapheme mappings). The disadvantage is that it is hard to produce multiple pronunciations with it, and it is prone to overlearning, in which case it memorizes word pronunciations as opposed to extracting meaningful pronunciation rules.

So far, we have not used any information—besides phonetic context—to produce word pronunciations. As one would expect, word morphology can have a large effect on word pronunciations, especially when it comes to stress. Predicting unstressed syllables is important for speech recognition, as these vowels tend to have very different characteristics than their stressed counterparts. The Spoken Language Systems Group at MIT proposed a system that uses word morphology information to generate word pronunciations with stress information. See Helen Meng et al., *Reversible Letter-to-Sound/Sound-to-Letter Generation Based on Parsing Word Morphology*, SPEECH COMMUNICATION, Vol. 18, No. 1, pp 47–63, North-Holland, 1996.

In their method, they generate a layered parse tree (shown in FIG. 2) to examine several linguistic layers of the words in the training set. Then, they examine various conditional probabilities along the tree, such as the probability that a symbol follows a column, etc. During pronunciation generation, they try to generate a parse tree for the word while maximizing its overall probability. The advantage of this method is that it generates very accurate pronunciations while also producing morphological structure. However, it needs the full morphological structure of words in the training set, which can be very expensive to provide when training for a new language. Also, this method cannot produce multiple pronunciations in its current form.

The overlapping chunks method tries to relate to human intelligence, as it mimics how people pronounce unseen words. The method uses multiple unbounded overlapping chunks to generate word pronunciations. Chunks are corresponding grapheme and phoneme sequences that are cut out from word pronunciations. For example, 'anua'→('ae n y .ah w .ah) is a chunk derived from 'manual'→(m 'ae n y .ah w .ah l). In this method, first, all possible chunks are generated for the words in the knowledge base. When a new pronunciation is requested, these chunks are recombined in all possible ways to produce the requested word. During this process, chunks can overlap if the overlapping phonemes and graphemes are equivalent. After finding all possible recombinations, the best pronunciation candidate is selected. In general, candidates with fewer and longer chunks are favored, especially if those chunks are largely overlapping.

The advantage of this system is that it is language independent, and it can truly produce multiple pronunciations. Also, very little language specific information is needed aside from the word pronunciations, although the words have to be aligned with their pronunciations. The main disadvantage of the system is that it requires a lot of run-time memory during pronunciation generation to speed up the recombination process. There are other theoretical deficiencies of this algorithm. See François Yvon, *Grapheme-to-Phoneme Conversion Using Multiple Unbounded Overlapping Chunks*, PROCEEDINGS OF THE INTERNATIONAL CONFERENCE ON NEW METHODS IN LANGUAGE PROCESSING, No. 2, Ankara, Turkey, 1996. Also in xxx.lanl.gov/list/cmp-lg/ 9608#cmp-lg/9608006.

Neural networks are used in many areas of automated learning, including to generate word pronunciations. The most popular network type is the multilayer perception network (MLP) where the processing units are arranged in several layers, and only adjacent layers are connected. During processing, activations are propagated from the input units to the output units. See Joe Picone, *Advances in Automatic Generation of Multiple Pronunciations for Proper Nouns*, Technical Report, Institute for Signal and Information Processing, Mississippi State, Mississippi, USA, September 1997. There is one input unit at each grapheme space (e.g., first letter, second letter, . . . of the word) for each possible grapheme, and similarly, there is one output unit at each phoneme slot (e.g., first phoneme, second phoneme, etc. of the pronunciation) for every phoneme of the language. During pronunciation generation, the input units at the appropriate graphemes of the word are activated. The pronunciation is composed from the phonemes by the output units holding the largest activation value at each phoneme slot. Neural networks are trained using an iterative backpropagation algorithm.

The advantages of this approach are that it is language independent, very little language-specific side information is needed, and it can produce multiple pronunciations. One can further improve this method by also assigning input units to phonetic features, so that it can make use of phonetic features. The disadvantage of this method is that the resulting neural network is large. Also, it is hard to capture the phonetic knowledge efficiently from the activation properties. For example, it is hard to separate the important information from the non-important information to balance the neural network size and performance.

An overview of the complexities and performances of the different approaches is shown in FIG. 1A with footnotes on FIG. 1B. Our goal was to find an automatic method that is fast, uses a small amount of space, and is effective at producing correct pronunciations for words.

SUMMARY OF INVENTION

In accordance with one embodiment of the present invention, a text-to-pronunciation system that is able to generate pronunciations for arbitrary words wherein the system extracts language-specific pronunciation information from a large training corpus (a set of word pronunciations), and is able to use that information to produce good pronunciations for words not in the training set.

DESCRIPTION OF THE DRAWINGS

FIG. 1A illustrates a data sheet of existing TTP systems and FIG. 1B are footnotes for FIG. 1A.

FIG. 2 illustrates linguistic layers used by a morphology-based TTP system.

FIG. 11 illustrates two different grapheme-phoneme alignments used during preprocessing. The top one is used during the iterative alignment process to update the conditional grapheme-phoneme probabilities. The bottom one is used by the learner.

FIG. 12 illustrates allowed and disallowed alignments for 'school'. Phonemes are assigned to the first most probable grapheme (letter).

FIG. 13 illustrates misalignments that the iterative aligner cannot correct.

FIG. 18 illustrates various alignments between (sh hh 'ow z) and (sh 'ow w z) with the same score.

FIG. 19 illustrates alignments during the phoneme insertion process.

FIG. 20 illustrates problematic insertions that would result in an infinite loop.

FIG. 22 illustrates the system's performance with various system parameters.

DESCRIPTION OF PREFERRED EMBODIMENTS OF THE PRESENT INVENTION

Figure 3:
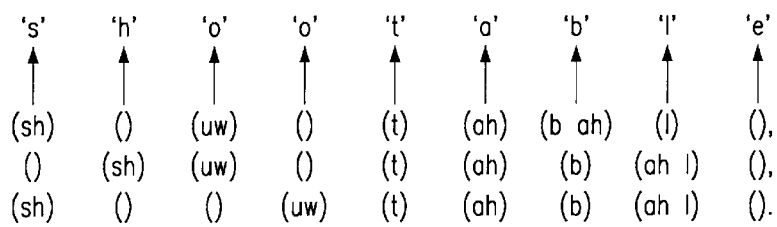
FIG. 3 illustrates possible phoneme-to-grapheme alignments for the word 'shootable'.

The purpose of this application is to teach how to build a system that is able to extract pronunciation information from a set of word pronunciations, and is able to generate pronunciations for words not in the list. Other desired properties of the system are that it should be language independent and require minimal information about the language in question. Also, the pronunciation generation should be fast and use only a small amount of space, while the pronunciation information should also be captured compactly.

An important factor we need to consider is that when we generate pronunciations used for speech recognition, we want to generate all acceptable (and plausible) pronunciations, so that the system will be robust. (We will refer to systems that generate all plausible pronunciations for words as text-to-pronunciation systems in the rest of this document.) Since one needs all plausible pronunciations, Applicants' system needs to be able to capture rules that can generate multiple pronunciations for a given word. Notice that this is not desirable when we generate pronunciations for speech synthesis, where we only want one pronunciation: the correct one.

The purpose of text-to-pronunciation systems is to produce a phonetic representation of textual data. The scope of such systems can vary from producing pronunciations for single words to transcribing technical papers to a phonetic representation. In the most extreme cases, the input domain can contain made-up words, acronyms, numbers, symbols, abbreviations or even mathematical expressions.

In practice, high-end text-to-pronunciation systems transcribe text in two steps. First, the input text is normalized during which numbers, symbols, abbreviations, and expressions are written out into their full textual form. In addition, acronyms are expanded into separate letters or pseudo-words if those constitute plausible (pronounceable) words in the given language. During the second step, the phonetic representations of the written-out phrases are generated. In this application, we are concerned with producing pronunciations for single words.

There are other aspects of text-to-speech conversion that are worth mentioning here. For many languages, such as Russian or English, morphological analysis is necessary to obtain the proper pronunciation of words. In Russian, for example, some vowels are reduced if they are unstressed, and the stress pattern of a word is determined by the word morphology. Some sort of lexical analysis (syntactical or morphological) is also required for the text normalization step. See Richard Sproat, *Multilingual Text Analysis for Text-to-Speech synthesis*, ECAI Workshop on Extended Finite-State Models of Language. ECAI, 1996. Also in xxx.lanl.gov/list/cmp-lg/9608#cmp-lg/9608012. For example, in English the phonetic form of '$5' is different in 'a $5 bill' and in 'I got $5'. In Russian, the case of nouns depends on their exact quantity; therefore, some sort of lexical analysis of quantifier structures is required to produce the full textual form of noun abbreviations. The necessity of lexical analysis in both steps has prompted some to combine the two phases of text-to-pronunciation conversion into one single process.

Languages are constantly evolving, and new concepts appear every day. Today it is not uncommon to use e-mail addresses as phrases in conversation. There is a tremendous morphological analysis going on in our head when we pronounce technical names that contain abbreviations. It is also likely that text-to-pronunciation systems will face such pseudo-words. For example, when pronouncing 'bsanders@mit.edu', 'bsanders' will very likely be an input to the word pronunciation generator. While one can detect such pseudo-words statistically, as the grapheme sequence 'bsa' is not common in word-initial position in English, one could also simply learn to insert the ('iy) sound in the grapheme context '$b__s'.

The present invention uses transformation-based error-driven learning. The method had to be automatic, which limited our choice to the last four systems in the background section. The overlapping chunks approach has a large space requirement, and the morphology-based system requires a significant amount of language specific information; therefore, both methods are unsuitable for our purposes. We chose the transformation-based error-driven learner over the neural network approach because it has a smaller memory requirement during pronunciation generation. Nevertheless, other rule-based systems that share similar qualities as the transformation-based learner may also be used. In addition, substitution and decision-tree based approaches can also be used to resolve lexical ambiguity. See, Ilyas Cicekli and H. Altay Güvenir, *Learning Translation Rules from A Bilingual Corpus*, PROCEEDINGS OF THE INTERNATIONAL CONFERENCE ON NEW METHODS IN LANGUAGE PROCESSING, No. 2, Ankara, Turkey, 1996. Also in xxx.lanl.gov/list/cmp-lg/9607#cmp-lg/9607027. See Walter Daelemans et al., *Uunsupervised Discovery of Phonological Categories through Supervised Learning of Morphological Rules*, PROCEEDINGS OF INTERNATIONAL CONFERENCE ON COMPUTATIONAL LINGUISTICS, Copenhagen, Denmark, 1996. Also in xxx.lanl.gov/list/cmp-lg/9607#cmp-lg/9607013. The benefit of Brill's system is that it is completely deterministic: rules are applied in a specific order. In the other systems rules are competing against each other, which greatly increases translation time. Also, in Brill's system the most relevant rules have the highest rank; therefore, much of the accuracy is achieved with the first few hundred rules. See Eric Brill, *Tranformation-Based Error-Driven Learning Parsing*, ASSOCIATION OF COMPUTATIONAL LINGUISTICS, 1993. See Eric Brill, *Transformation-Based Error-Driven Learning and Natural Language Processing: A Case Study in Part of Speech Tagging*, Ph.D Thesis, The Johns Hopkins University, Department of Computer Science, 1995. Also in COMPUTATIONAL LINGUISTICS, December 1995. This allows us to compromise between translation time and pronunciation accuracy.

Before we illustrate how transformation-based, error-driven learning is used for text-to-pronunciation (TTP) systems, it is important to see how it was originally applied to part-of-speech (POS) tagging. In the following paragraphs, we describe the core of the learning algorithm in a case study for part-of-speech tagging. We also discuss the similarities and differences between POS tagging and TTP systems.

Both part-of-speech tagging (POS) and text-to-pronunciation systems (TTP) try to resolve lexical ambiguity. In a POS tagging system, we want to find the part of speech for each word in a sentence. Each word has a list of possible parts of speech, but usually only one of them is realized in a sentence. For example, take the sentence:

He leads the group.

The possible part-of-speech tags are listed for each word in Table 1; the sentence above is tagged the following way:

TABLE 1

Possible part-of-speech tags for words in the sentence 'He leads the group'

| He | leads | the | group |
|---|---|---|---|
| ↑ | ↑ | ↑ | ↑ |
| N | V | det | N |

| Word | Part of Speech |
|---|---|
| group | N, V |
| he | N |
| leads | N, V |
| the | det |

In a text-to-pronunciation problem we have a word composed of a sequence of letters (graphemes), and we want to map that sequence into the pronunciation—a sequence of phonemes. An intuitive solution would be to map each letter into its pronunciation, since we pronounce words based on their spelling. In this case, we can assume that each letter has several possible ways of being pronounced, and we have to find the one that is actually realized in the pronunciation. For example, to produce the pronunciation for 'computer', we need to select, for each letter, the proper phoneme sequence from the possible sequences shown in Table 2.

The realized pronunciation is:

```
_c__o__m__p__u__t__e__r_
 ↑  ↑  ↑  ↑  ↑   ↑ ↑  ↑
(k)(ah)(m)(p)(y uw)(t)( )(er)
```

Eric Brill's transformation-based error-driven learner was found efficient to resolve lexical ambiguities of these sorts. See Eric Brill, *Transformation-Based Error-Driven Learning and Natural Language Processing: A Case Study in Part of Speech Tagging*, PhD Thesis, The Johns Hopkins University, Department of Computer Science, 1995. Also in COMPUTATIONAL LINGUISTICS, December 1995.

TABLE 2

Possible pronunciations of individual letters in the word 'computer'

| Grapheme | Phoneme Sequences |
|---|---|
| c | (k), (s) |
| o | (ah), (ow), (aa), (aw), (ao), (uw) |
| m | (m) |
| p | (p) |
| u | (ah), (y ah), (y uw), (uw) |
| t | (t) |
| e | (ih), (iy), (eh), (ah), ( ) |
| r | (r), (er). |

In addition to text-to-pronunciation, this transformation-based error-driven learning method can also be applied to other problems with lexical ambiguity, such as syntactic parsing, prepositional attachment, spelling correction, or grapheme-to-phoneme conversion. See, Eric Brill, *Transformation-Based Error-Driven Parsing*, ASSOCIATION OF COMPUTATIONAL LINGUISTICS, 1993. See, Giorgio Satta and Eric Brill, *Efficient Transformation-Based Parsing*, ASSOCIATION OF COMPUTATIONAL LINGUISTICS, 1996. See, Helen Meng et al., *Automatic Rule Acquisition for Spelling Correction*. In International Conference on Machine Learning, Nashville, Tenn., U.S.A. 1997. See, Caroline B. Huang et al., *Generation of Pronunciations from Orthographies Using Transformation-Based Error-Driven Learning*, International Conference on Speech and Language Processing, pp 411–414, Yokohama, Japan, 1994.

Methods for part-of-speech (POS) tagging evolved similarly to those for TTP translation. In fact, some of the approaches examined in the background are also used for part-of-speech tagging. The first part-of-speech taggers used hand-written rules, and annotated text with 77% accuracy. See [14], Helmut Schmid, *Part-of-Speech Tagging with Neural Networks*, International Conference on New Methods in Language Processing, No. 1, Manchester, England, 1994. Also in xxx.lanl.gov/list/cmp-lg/9410#cmp-lg/9410018. Once tagged corpora became available, statistical approaches could extract probabilistic information to achieve better performance. Neural networks achieve 86–95% tagging accuracy, depending on the size of the training set. The accuracy of Markov and Hidden Markov models is around 96%. These statistical methods capture tagging information with a large number of weights (activation values or probabilities).

In this decade, attention turned to rule-based systems because it is easier to understand the meaning of rules than the implication of probabilistic information. Brill's transformation-based error-driven learner, also a rule-based system, achieves 97% tagging accuracy. See, Eric Brill, *Transformation-Based Error-Driven Learning and Natural Language Processing: A Case Study in Part of Speech Tagging*, PhD Thesis, The Johns Hopkins University, Department of Computer Science, 1995. Also in *Computational Linguistics*, December 1995. Other rule-based systems, such as decision trees and substitution based learners are also effective in resolving lexical ambiguity. See, Ilyas Cicekli and H. Altay Güvenir, *Learning Translation Rules from A Bilingual Corpus*, PROCEEDINGS OF THE INTERNATIONAL CONFERENCE ON NEW METHODS IN LANGUAGE PROCESSING, No. 2, Ankara, Turkey, 1996. Also in xxx.lanl.gov/list/cmp-lg/9607#cmp-lg/9607027. Nevertheless, transformation-based learners are superior to both alternatives: they can encapsulate the behavior of decision trees, and they overperform substitution-based systems because they are deterministic.

In the transformation-based error-driven learner for the case of part-of-speech tagging; the problem we are trying to solve is to tag a sentence with part-of-speech information. We assume that we have a large set of sentences with proper tagging (we will refer to it as the truth), and we want to find tagging rules so that we can reproduce the correct part-of-speech information from scratch.

The main mechanism in the transformation-based error-driven learner is rule induction. Rule induction takes a preliminarily tagged corpus as an input (referred to as proposed solution), and it finds a transformation rule that brings the tagging closer to the truth. The main idea is that if we iteratively apply this step, we get a sequence of rules that brings the tagging closer and closer to the correct tagging.

These are the steps of the transformation-based, error-driven learner:

1. First, we tag the words in the training set based on some scheme. This will initially be the proposed tagging.
2. We score the proposed solution by comparing it to the truth, and find a transformation rule that brings the proposed tagging closer to the correct tagging.
3. If we find a rule, we save it and apply it to the entire training set. The resulting tagging will be the proposed solution for the next step. We then repeat from step 2.
4. We stop when we cannot find a rule that improves the score, or we reach the truth. At that point the learner cannot improve the score any more.

There are various pieces of information that need to be further specified for system. They are the initial tagging scheme (initial state), the scoring function we use to compare the proposed solution to the truth, the space of allowable transformations, and the rule selection strategy (which rule we pick from the ones that improve the score).

The initial state is not specified by the learner. We can start by assigning the most popular tag to each word or even by tagging every word as noun. The only important thing to look out for is that the learner will learn transformation rules to correct the initial tagging; therefore, when one applies the learned rules to untagged sentences, these sentences will have to be in the corresponding initial state for the rules to make sense. Therefore, it is preferred that the initial state is deterministic.

The fact that the initial state is not specified makes it possible to use this learner as a post-processor to correct the tagging solutions proposed by other systems. For example, one might initially tag sentences with an existing part-of-speech tagger, and use this system to find transformation rules that improve the performance of the original tagger.

The main property of the scoring function is that it encapsulates the extent of the difference between the proposed solution and the truth. The specifics of the scoring function are only important if we have a strategy for choosing among the rules that improve the score. Brill's learner always picks the rule that improves the score the most. This strategy is useful, as this way the first rules will have the biggest impact on the correctness and the transformation rules will be ordered based on their importance on the performance.

It is important to choose the scoring function in a way that the penalties for deviations between the truth and the proposed solutions are in line with the importance of these mistakes. As an example, a noun tagged as an adjective may not be as bad a mistake as a noun tagged as a verb.

The space of possible transformations is potentially infinite. However, if we want the learner to have any practical value, we need to limit the space of allowable transformations. Brill uses rule templates to achieve this. A rule template is a rule where the specifics are not filled out, such as:

Change tagging $T_1$ to $T_2$ if the following word is $w_1$ or
Change tagging $T_1$ to $T_2$ if the following word is tagged $T_3$.

When the learner looks for rules, it tries to fill out these templates with specific values and see how the resulting rules improve the score. Unfortunately, there are a vast number of ways to fill out the rule templates, yet only a small percentage of them makes sense. To solve this problem, the search for rules is data-driven. When the learner compares the proposed solution to the truth, it sees where they deviate from each other. Therefore, the learner at each mistake can propose rules that correct that particular mistake. Note that there can be several rules that correct a given mistake.

We still need to evaluate the effectiveness of each proposed transformation rule. Notice that a rule which was proposed to correct a mistake does not always improve the overall score because it applies at all locations that have the required context, and not just where the rule was proposed. Therefore, it is possible that a rule will lower the score at some of the places where it applies.

To evaluate the effect of a rule, we need to find out how it influences the score at each location where it applies. Fortunately, we can do that very efficiently if we keep some statistical information around.

To see how some statistical information can speed up rule evaluation, suppose our scoring function is simply the number of words with correct tagging. The rule we are trying to evaluate is:

Change tag $T_1$ to $T_2$ in context C.

For this rule the change in the score is:

$$\Delta score = N(T_1, T_2, C) - N(T_1, T_1, C)$$

where $N(T_{proposed}, T_{correct}, C)$ is the number of words in context C that are tagged as $T_{proposed}$ and should be tagged as $T_{correct}$.

Therefore, if we have the contextual statistics available, the evaluation of a rule's effectiveness takes only a very short, constant time.

There are similarities and differences between the POS tagging and the TTP translation problem.

In a text-to-pronunciation system, we try to translate the word spelling (letters) to the word pronunciation (phonemes). While some languages have one-to-one correspondence between letters and phonemes, in most languages phonemes are only loosely associated with letters. An example in English is the word 'shootable', which is pronounced as (sh 'uw t .ah b .ah l). If we were to have one-to-one correspondence between letters and phonemes (or even phoneme sequences), we would end up with many possible alternatives (FIG. 3).

Figure 4:
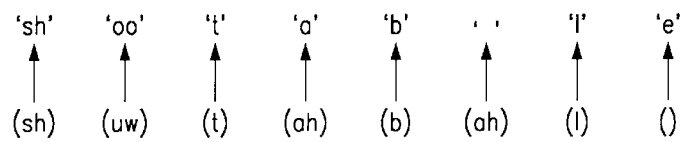
FIG. 4 illustrates a phoneme-group to grapheme-group alignment for the word 'shootable'.

The main problem is that in many languages certain phonemes are represented by a group of graphemes. Also, phoneme insertions and deletions are natural phonetic processes that have to be accounted for. Therefore, mappings are better characterized as group-to-group, meaning mapping a group of phonemes to a group of graphemes (FIG. 4).

Figure 5:
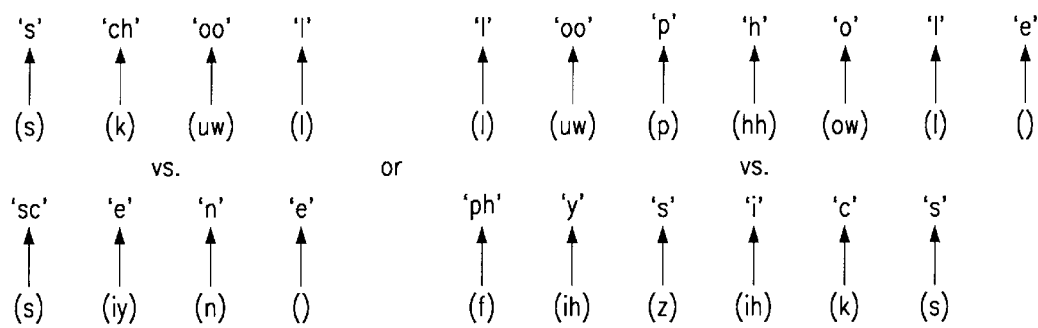
FIG. 5 illustrates different groupings of chunks 'sc' and 'ph' in English.

Unfortunately, these groups are not predetermined in a given language. Graphemes in a word can be assigned to plausible groups in many ways depending on word morphology and grapheme context. For example, the grapheme chunks 'sc' and 'ph' are grouped differently in 's|ch|oo|l' and 'sc|e|n|e', or 'l|oo|p|h|o|l|e' and 'ph|y|s|i|c|s' (FIG. 5).

Figure 6:
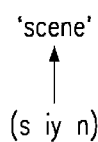
FIG. 6 illustrates overgrown phoneme-grapheme alignments that do not have any useful information.

This means that groups need to possibly be reassigned during the learning process; therefore, we need rule templates that do reassignment. Another potential problem with the group-to-group assignments is that if group assignments are automatic, they may grow without bounds, rendering the alignments useless (FIG. 6).

Figure 7:
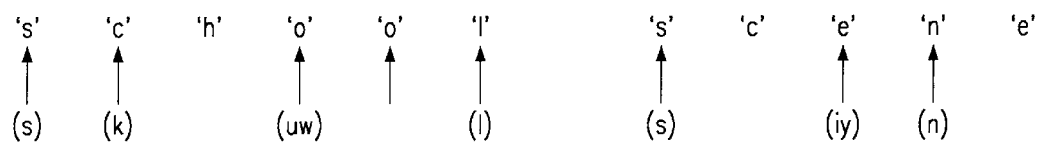
FIG. 7 illustrates a phoneme-grapheme alignment used in Applicants' system.

One solution is to assign phonemes to only one of the letters of the matching group. This would basically revert the alignment to the one in FIG. 3. To avoid the problem mentioned there, we need to decide in a deterministic way which phoneme is assigned to which letter in the group. Then, the only required transformations are the insertion, deletion, or modification of phonemes, as in this solution phonemes are always assigned to a single grapheme (FIG. 7). We chose this solution because it simplifies the rule templates, and it is deterministic; thus, it proposes more coherent rules during rule induction.

To apply the learner to the problem of text-to-pronunciation translation, we need to specify:

the initial state,
the allowable transformation templates, and
the scoring function.

To minimize the amount of work that needs to be done during learning, we chose to assign the most probable phoneme sequence to each grapheme as the initial state. This way, the initial guesses will be closer to the truth should we use a simple string edit distance. We could also use a somewhat more intelligent approach that handles letter groups, such as 'ph' or 'ch'. Unfortunately, these groups can potentially conflict with one another as discussed previously, so we avoid this issue, especially since the context-based rules can encapsulate the effect of these letter groups.

In either case, we need to find the conditional probabilities of graphemes and phoneme sequences. There are two ways of getting this information. Either a human expert can input the grapheme-phoneme sequence correspondences for a given language, or we can try to automatically extract this information from the training corpora. The latter method is preferred as it will result in a more language independent system.

We can obtain the conditional probabilities of grapheme-phoneme correspondences if we align the words with their pronunciations. For that, we can use a probabilistic aligner given that we have some approximate values for the conditional probabilities themselves. While this seems like a vicious circle, the real value of this cycle is that if we have some approximate probabilities, we can use the probabilistic aligner to obtain better probability estimates. Furthermore, we can repeat this process to get better and better estimates, until the conditional probabilities are stable. Nevertheless, the most probable alignment is not necessarily the correct alignment; therefore, this method can never perfectly obtain the grapheme-phoneme conditional probabilities.

We found two ways to find a reasonable initial estimate for these probabilities. One of them—the slice algorithm—requires no additional information besides the word pronunciations, while the other requires the knowledge of some basic language-specific information for phonemes and letters.

The slice algorithm can make reasonable guesses on the probabilities of grapheme-phoneme correspondences. The algorithm relies on the observation that the pronunciations of words that start similarly also start similarly, and one can find phoneme and grapheme units of the language by finding contrasting examples: words that start identically, but differ very soon after both in their spellings and their pronunciations.

Figure 8:
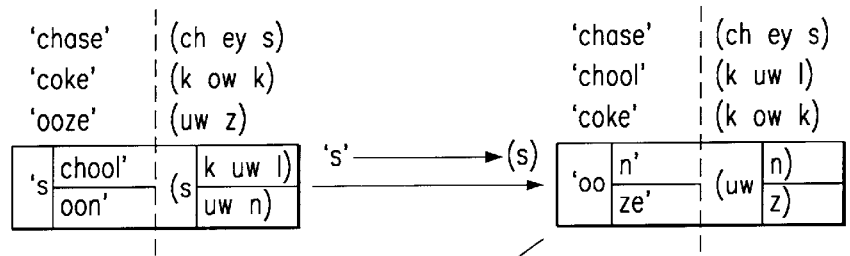
FIG. 8 illustrates a phoneme-grapheme chunk from contrasting 'school' with 'soon'.

An example of contrasting words in English is 'school' and 'soon', illustrated in FIG. 8. By contrasting 'school' with 'soon' we can find the following corresponding phoneme-grapheme chunk: ('s'→(s)).

Figure 9:
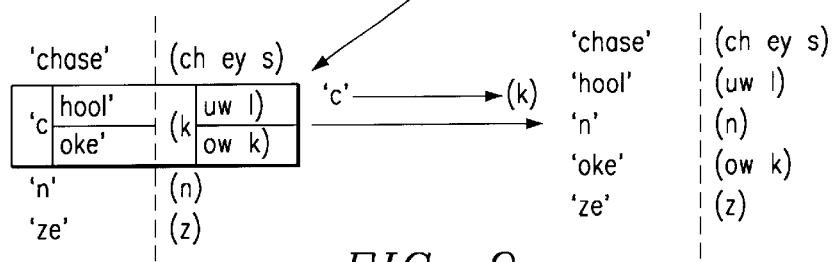
FIG. 9 illustrates successive slicing in the slice algorithm.

Using the notion of contrasting word pairs, the slice algorithm works the following way. It looks through the words in the training set, and finds words that have the same few initial letters and phonemes in their pronunciations. It tries to find contrasting pairs that differ both in pronunciation and spelling shortly after the beginning. If it finds sufficiently many contrasting pairs that differ at the same locations, it assigns the identical initial letters to the identical initial phoneme sequence. These segments are sliced off the words and their pronunciations, and the resulting truncated words and pronunciations are placed back to the training pool. FIG. 9 illustrates the process of successive slicing.

Sooner or later there will be no contrasting word pairs. When the program cannot propose a new corresponding phoneme-grapheme pair, it tries to use the discovered grapheme-phoneme alignments to further slice off fragments from the words. In this process (referred to as shredding) the algorithm tries to place up to three grapheme-phoneme alignments along the beginning of the words while allowing graphemes to map to no phoneme.

Figure 10:
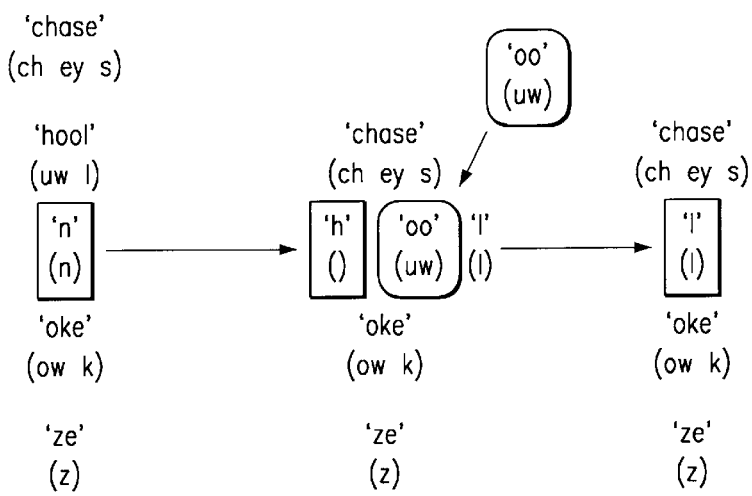
FIG. 10 illustrates discovered grapheme-phoneme pairs to find new pairs in the slice algorithm (shredding). The previously discovered 'oo'→(uw) alignment is used to discover the 'h'→( ) chunk. One letter chunks, 'h'→( ) and 'l'→(l) are automatically assigned.

If there are grapheme and phoneme slices between the found chunks, they are proposed as corresponding chunks as well (FIG. 10).

The algorithm also automatically assigns one letter words to their pronunciations, and drops words in which the letters are completely sliced off, even if they have remaining phonemes. Once all the words have been shredded, the program returns to the slicing process. The iteration of alternating shredding and slicing ends when all the words completely disappear, or when shredding has no effect.

The reason for the slice algorithm is to have a language independent way of finding phoneme-grapheme correspondences in large pronunciation corpora without any additional language-specific knowledge. Nevertheless, the algorithm is theoretically not completely language independent. One problem area is that the algorithm is not symmetric; it slices the words at their beginning. Therefore, it is not useful for languages that have irregular pronunciations near the beginning of words—such as silent letters or seemingly random letter-pronunciations—although we do not know of any such language.

Another way of finding grapheme-phoneme correspondences is outlined in reference. Caroline B. Huang et al., *Generation of Pronunciations from Orthographies Using Transformation-Based Error-Driven Learning*, International Conference on Speech and Language Processing, pp 411–414, Yokohama, Japan, 1994. This approach assumes that we know the vowel/consonant qualities for both phonemes and letters of the language. With that information, we align the words with their pronunciations while minimizing the vowel-consonant differences between the corresponding letters and phonemes. This approach gives better initial guesses while requiring slightly more phonetic knowledge than the slice method. Thus, a question naturally arises: should we add more phonetic information to achieve better accuracy?

Our design goals state that we want to require as little language-specific side information as possible. While doing a preliminary alignment based on vowel/consonant quality gives better initial guesses for the conditional probabilities of grapheme-phoneme pairs, the probabilities after the iterative alignment process are basically identical. Therefore, the slice method is used in the present system.

Alignment of graphemes to phonemes is used to find the conditional probabilities of grapheme-phoneme correspondences. These probabilities are needed to come up with initial pronunciations for the words by assigning the most probable phoneme sequences to each letter (grapheme). However, there is also another, more compelling reason for aligning the phonemes with the graphemes.

In part-of-speech tagging systems, tags are automatically "aligned" with the words they belong to. Applicants make use of this alignment, since the rule templates used for the part-of-speech tagging system refer to both the preceding/following words and their tags. In a text-to-pronunciation system the alignment between graphemes and phonemes is not obvious, but nevertheless this correspondence is needed to refer to both adjacent graphemes and phonemes. Therefore, the graphemes and phonemes must be aligned with each other throughout the learning and pronunciation generation process.

There are two different alignment processes. When finding the conditional probabilities of grapheme-phoneme sequence pairs, we align grapheme sequences to phoneme sequences. However, during the learning process we assign phonemes individually to graphemes as discussed previously. The difference between the two alignments is illustrated in FIG. 11.

The need to assign single phonemes to single graphemes results in some ambiguity if the original phoneme or phoneme sequence was aligned to a group of graphemes. To avoid performance degradation due to random selection between the possible assignments, each individual phoneme is assigned to the grapheme with which it has the highest conditional probability. If the probability is the same for several graphemes, the phoneme is assigned to the leftmost of those graphemes (FIG. 12).

For example, 'school' is always aligned as shown on FIG. 12, and not any other way, because the 'c'→(k) alignment has higher probability than the 'h'→(k), and (uw) is always aligned with the first 'o'.

The aligner in our system has two corresponding phases. In the first phase phonemes or phoneme sequences are aligned with graphemes or grapheme groups. This is done by a dynamic aligner that maximizes the overall probability of the alignment based on the individual probabilities.

If there is a need to align the phonemes individually with the letters, phonemes or phoneme sequences that are aligned with a grapheme group are distributed among the graphemes using another dynamic aligner, which maximizes the joint probabilities for the individual phonemes in the sequence. If this dynamic aligner encounters a tie in the probabilities, it prefers the alignment where more phonemes are assigned to graphemes closer to the beginning of the word.

It is questionable whether the aligner with iterative probability reassessment achieves correct grapheme-phoneme correspondence. If the initial alignments were conceptually wrong, the iterative aligner would not be able to correct these mistakes. FIG. 13 illustrates a possible scenario, where the slice algorithm aligned 'in' with (ih ng). Although it makes more sense to align 'i' with (ih), and 'ng' with (ng), the aligner has no means of making such observation, since maximizing the joint probabilities will reinforce the problem. This issue could be solved by experimenting with the location of phoneme-group and grapheme-group boundaries in common neighbors to see if a different boundary would make the alignments more general.

Another related problem is that aligning 'ei' with (iy) would be better than aligning 'e' and 'i' separately. This problem could be resolved similarly, by investigating the effects of grouping common neighbors, where one grapheme maps to an empty pronunciation.

It is also questionable whether the alignment with maximal joint probability is the proper alignment. In an experiment, 1000 words were hand aligned with their pronunciations, and the conditional grapheme-phoneme sequence probabilities were calculated. The pronunciations were then realigned using these probabilities. The phoneme-alignment error was 1.5%, with a word error rate of 3.6%.

These words were also aligned using the probabilities produced by the slice algorithm. A comparable 3.0% phoneme-alignment error and 14% word error was produced. When examining the alignment errors, it was found that in 7.9% of the words the alignments were not necessarily bad. These word errors resulted from either a different, but correct alignment (5.3%), or an alignment that was simply different, but not wrong (2.6%). The other 6.1% of the words had correctable misalignments (2.5%) or major discrepancies (3.6%).

In summary, while iterative alignment may not achieve perfect alignments due to its nature, it is effective in correcting approximate grapheme-phoneme sequence probabilities. Also note that by the time the alignments are used in the learner, all correctable mistakes are corrected. Therefore, the visible word error rate of the slice algorithm with iterative alignment is only 3.6%.

A simple string edit distance is used to calculate the correctness of the proposed solution. See, Eric Sven Ristad and Peter N. Yianilos, *Learning String Edit Distance*, Research Report cs-tr-532-96, Princeton University, Princeton, N.J., USA. Also in xxx.lanl.gov/list/cmp-lg/9610#cmp-lg/9610005. The edit distance is the minimal number of phoneme insertions, changes, and deletions needed to bring the proposed solution to the truth. We could choose to penalize all three transformations with the same weight, except that stress mistakes are taken only half as seriously when learning stress information was included.

Since the transformation-based error-driven learner is data-driven—meaning that only rules that correct mistakes are suggested—the scoring function needs to be able to produce feedback on how the proposed pronunciation has to be corrected.

Figure 14:
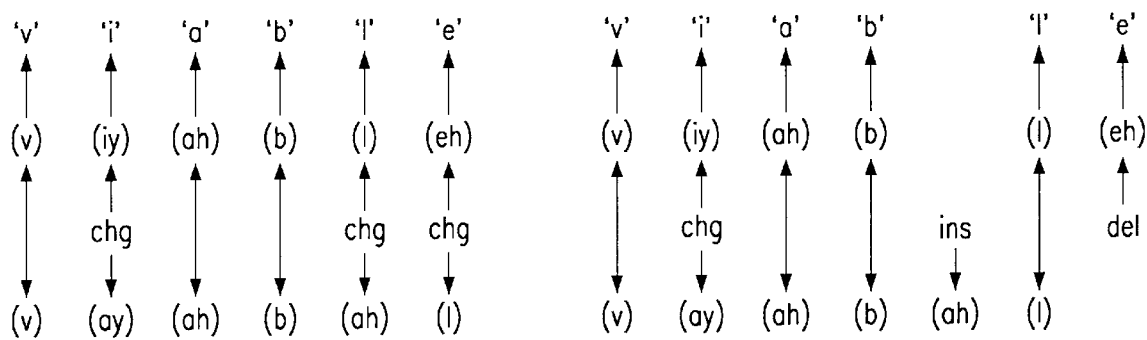
FIG. 14 illustrates non-uniform alignments of the same disparity.

A dynamic aligner is used to minimize the string edit distance between guesses and the truth, which unfortunately does not produce uniform alignments. This means that if the same non-matching phoneme sequences are in two word pairs, the resulting alignments of the non-matching parts are not necessarily the same (FIG. 14). Consequently, if rules from these alignments are proposed, there is not a uniform picture on each mistake.

This problem is solved by adding phonetic knowledge to the system. The distance function used in the alignments is changed so that at phoneme substitutions, phonemes with similar phonetic qualities (both are vowels, both are stops, etc.) are preferred to be aligned with each other. Here the assumption relied upon is that even if there is a disparity between the proposed and the correct pronunciation, the differing phonemes have similar phonetic features.

There is a potential problem with using simple string edit distance as an error measure; namely, that it is probably not correct to weigh every phoneme error equally. For example, the distance measure should weigh phoneme differences that are not very contrasting less heavily if one wants to use the generated pronunciations in a speech recognizer.

An experiment to investigate this problem was done. In the experiment two sets of pronunciations were compared. Human subjects (speech recognition experts) were asked to rate each pronunciation on a three-point scale (1.00–3.00). Surprisingly, the set with the better edit score (84% correct) was rated uniformly lower by the subjects (2.00). The other set with 79% edit score was rated at 2.25. Nevertheless, the error measure in our experiment was not changed because requiring relative seriousness of phoneme differences would violate the desire to use minimal linguistic knowledge and be automatic and language independent.

Figure 15:
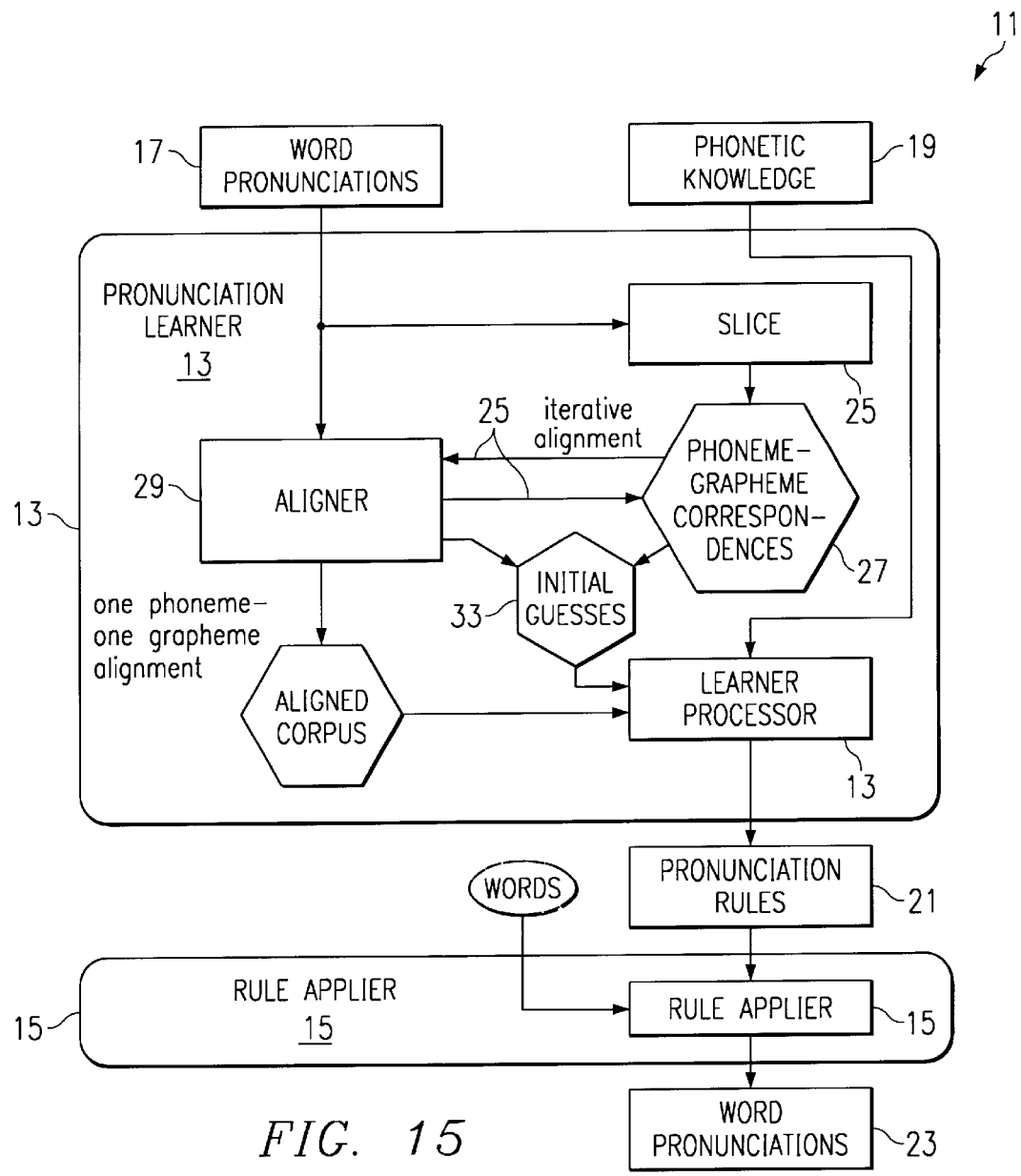
FIG. 15 illustrates a system overview.

The text-to-pronunciation system according to the preferred embodiment of the present invention has two major parts, the learner 13 and the rule applier (pronunciation generator) 15, as illustrated by FIG. 15. The pronunciation learner 13 extracts pronunciation rules from a training corpus 17 and supplemental phonetic information from a source 19, and the rule applier 15 applies the resulting rules 21 to produce pronunciations 23 for new or unseen words.

Learning the pronunciation rules consists of five steps. The first four steps are mere preprocessing, the actual learning takes place during the fifth step. The steps are:

1. Finding initial approximations for the grapheme-phoneme conditional probabilities using the slice algorithm 25.
2. Finding more precise grapheme-phoneme conditional probabilities using iterative probabilistic (re)alignment of grapheme and phoneme sequences 27 using aligner 29.
3. Preparing for learning. Aligning individual phonemes with graphemes in the training set (31) using aligner 29.
4. Initializing for learning. Proposing an initial pronunciation guess 33 for each word.
5. Finding pronunciation rules (21).

For the learning process, we need the following language-specific information:

a large set of word pronunciations (17), and phonetic features, their importance and feature descriptions for all phonemes (19).

All phonetic features for a specific language is not needed, just the important ones, such as consonant/vowel quality, place of articulation, stop-fricative quality, etc. The learner 15 works with a very small set of phonetic features as well, although adding features tends to improve the performance of the system.

Figure 16:
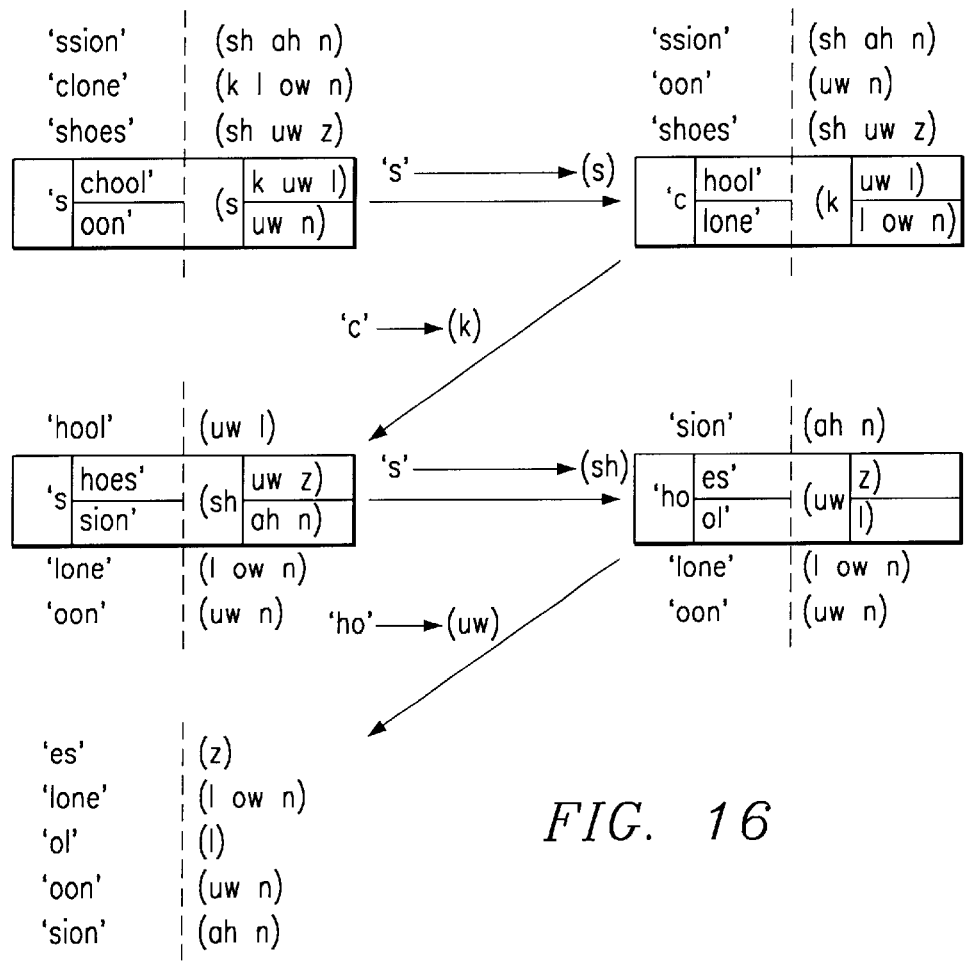
FIG. 16 illustrates errors that arise within the slice algorithm.

Finding initial approximations for the grapheme-phoneme conditional probabilities is done using the slice algorithm 25. This method requires no linguistic information besides the word pronunciations. The output of the slice algorithm tends to be very noisy because the algorithm proposes rules as it sees them, and one bad proposition usually results in a whole set of bad propositions. This problem is illustrated by FIG. 16, where by the end of the slicing, only 40% of the remaining word chunks are consistent with their pronunciations. Suggesting corresponding phoneme-grapheme pairs from these inconsistent chunks is very error-prone.

After constructing the initial guesses (33), an iterative probabilistic aligner 29 is used to get the true conditional probabilities for the corresponding grapheme and phoneme sequences. To filter out incorrect guesses and to aid the discovery of new alignments, every conditional probability P(phonemes, graphemes) is taken to be at least $P_{min}^{1.1Ngraphemes-0.1+0.3|N_{graphemes}-N_{phonemes}|}$, where $N_{graphemes}$ and $N_{phonemes}$ is the number of graphemes and phonemes in the corresponding sequences respectively.

Using this probability function forces the aligner 29 to associate a large number of graphemes to an equal number of phonemes.

During the last step of the preprocessing, the aligner 29 breaks down multi-phoneme to multi-grapheme alignments into a series of one-to-one alignments. If the alignment had more than one phoneme in it, they are aligned along the graphemes using a dynamic aligner. Individual phonemes are aligned to the grapheme with which they have the highest conditional phoneme-grapheme probability. If there is a tie, the phoneme is assigned to the leftmost grapheme in the tie.

The aligner 29 does not need any language-specific information about the phonemes or graphemes, since it works purely based on the conditional probabilities. Therefore, the entire preprocessing can be done without any language-specific information. We discussed previously, however, that phonetic information greatly improves the performance of rule finding, as proposed rules will be more accurate if the scoring function involves some phonetic knowledge.

In our experiments, the precision of the system generally improved with the amount of phonetic knowledge in the system. Therefore, it is advised that an expert describe some language-specific phonetic information. To make this possible a phonetic information structure is added to our learner. It basically allows an expert to specify:

the stress marks in a language, the vowels of the language (defined as phonemes that need to have stress information), phonetic features for some or all phonemes, frequent grapheme or grapheme sequence for each phoneme, the relative importance of features, phonemes that should be treated as equivalent[1], and phoneme name substitutions[1].

[1] We included phoneme renaming to allow experiments with different numbers of stress levels, and also because some of our old pronunciation systems used different symbols for the same phonemes. This renaming also simplifies comparing other systems' performance to our system.

Nevertheless, asking for phonetic information sacrifices the attempt that the learner be completely automatic and require minimal side information. Fortunately, some information can be extracted purely from the pronunciation dictionaries. The feasibility of some of the techniques to extract these features was examined.

One can extract phoneme-grapheme correspondences from the dictionary using the slice algorithm as described previously. The method requires linear time ($O(\Sigma_i length(word_i))$).

If the pronunciation dictionary contains stress information, one can separate vowels from consonants based on the fact that there should be only one vowel in each syllable, or in other words, for each stress mark. Stress marks are conventionally placed in front of the syllable they refer to, but their exact location is uncertain except for the requirement that they occur before the vowel of the syllable. Therefore, the conditional probabilities P(a is vowel|b is vowel) and P(a is consonant|b is consonant) can be calculated. Using these probabilities, we can find which assignment of consonant/vowel qualities is the most feasible. This process should take ($O(\Sigma_i length(word_i)+N^2_{phonemes})$) execution time, where $N_{phonemes}$ is the number of different phonemes in the language.

Applicants use phonetic information specified by an expert, as it requires negligible effort; thus, the performance gain from the use of this information outweighs the desire to keep language-specific information to the bare minimum.

Before the learning process can start, the learner (13) must be initialized by proposing an initial pronunciation for each word in the training set.

The initial pronunciations are calculated based on the individual phoneme-grapheme conditional probabilities. To get the initial pronunciation for each word, the most common phoneme sequence is assigned to each grapheme in the word. However, in some cases the most common phoneme sequence is an empty sequence. For example, the most probable transcription of 'e' in English is an empty sequence, as word-final 'e'-s in the language are almost always silent. We ran some experiments and it turned out to be more advantageous to always assign a non-empty phoneme sequence to a letter. Therefore, if the most probable phoneme sequence for a letter is empty, Applicants teach to assign the second most probable phoneme sequence to that letter.

Figure 17:
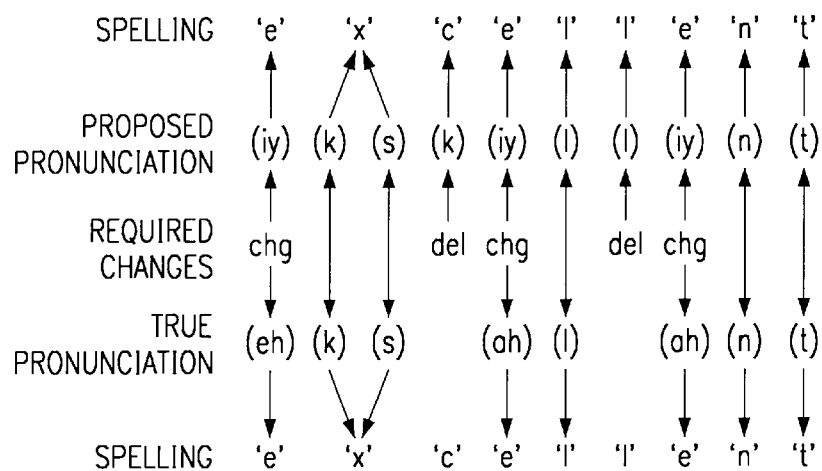
FIG. 17 illustrates a phoneme-grapheme alignment scheme used by the learner.

In the learning process, one tries to find transformations that bring the proposed pronunciations closer to the truth. It was discussed previously that it is important to keep phonemes aligned with graphemes individually. To achieve this, we used the representation in FIG. 17 for the learning process.

Each phoneme in the pronunciation guess is assigned to a letter. Initially, phonemes are aligned with the letter for which they were generated. (This is the static alignment.) The pronunciation guess is aligned with the truth, as well, with the necessary corrections marked. Finally, the truth is aligned with the spelling, the same way it was aligned in the training set.

This information is used later when the proposed pronunciation approaches the truth, so that one gets a more precise notion of which letters the phonemes correspond to in the proposed pronunciation. (This process is called dynamic alignment.) The use of this information was found to improve the effectiveness of the learned rules.

During the learning process, one looks for rules (21) that bring the proposed pronunciations closer to the truth and then applies one of the rules found to get new pronunciation guesses.

A data-driven approach is used to find useful rules. The proposed pronunciations to the truth are compared, and rules are proposed each place where the pronunciations deviate from each other to correct the mistake. The comparison is done by aligning the proposed solution with the truth to find necessary phoneme insertions, deletions or substitutions.

Rules are chosen from a set of allowable rule templates by filling out the blanks. The rule templates used in the system are:

Change $p_i$ to $p_j$ if it is aligned with $l_i$, and is in a certain context C, Delete $p_i$ if it is aligned with $l_i$, and is in a certain context C, and Insert $p_i$ in context C.

In these templates, context C can be '_$P_1 P_2 \ldots P_N$', '$P_1 P_2 \ldots P_N$_' , ..., '$P_1 P_2 \ldots \_P_N$', or ($\_l_1 l_2 \ldots l_N$), ($l_1 \_l_2 \ldots l_N$), ..., ($l_i l_2 \ldots l_N$), ..., ($l_1 l_2 \ldots l_N\_$), where N denotes the context length and ranges from one to the maximum context length ($1 \ldots N_{context}$). For example, if the pronunciation guess is

| word | 'c' | 'h' | 'a' | 'r' | 'm' |
|---|---|---|---|---|---|
| | ↑ | ↑ | ↑ | ↑ | ↑ |
| Proposed pronunciation | (ch) | ('er) | | (r) | (m) |
| | | ↑ chg ↓ | | | |
| | ↕ | | ↕ | ↕ | |
| True pronunciation | (ch) | | ('aa) | (r) | (m) | the proposed rules for maximum context of 3 are
1. Change ('er) to ('aa) if aligned with 'a' in context 'h_'
2. Change ('er) to ('aa) if aligned with 'a' in context '_r'
3. Change ('er) to ('aa) if aligned with 'a' in context 'ch_'
4. Change ('er) to ('aa) if aligned with 'a' in context 'h_r'
5. Change ('er) to ('aa) if aligned with 'a' in context '_rm'
6. Change ('er) to ('aa) if aligned with 'a' in context '$ch_'
7. Change ('er) to ('aa) if aligned with 'a' in context 'ch_r'
8. Change ('er) to ('aa) if aligned with 'a' in context 'h_rm'
9. Change ('er) to ('aa) if aligned with 'a' in context '_rm$'
10. Change ('er) to ('aa) if aligned with 'a' in context (ch_ _)
11. Change ('er) to ('aa) if aligned with 'a' in context (_ _r)
12. Change ('er) to ('aa) if aligned with 'a' in context ($ ch _ _)
13. Change ('er) to ('aa) if aligned with 'a' in context (ch_ _r)
14. Change ('er) to ('aa) if aligned with 'a' in context (_ _r m)
15. Change ('er) to ('aa) if aligned with 'a' in context ($ ch _ _r)
16. Change ('er) to ('aa) if aligned with 'a' in context (ch_ _r m)
17. Change ('er) to ('aa) if aligned with 'a' in context (_ _r m $).

Once every mismatch between the correct and the proposed pronunciations are enumerated, the proposed rules are ranked based on how effective they are, that is, how much they improve the score. This can be easily calculated if some statistical information is kept.

For example, the change in the error for rule 8 above Change ('er) to ('aa) if aligned with 'a' in context 'h_rm' is $$\Delta\text{error} = \Delta\text{error}_{worsen} + \Delta\text{error}_{improve}$$

$$= \text{weight} * (N((er), 'a', (er), 'h\_rm') - N((er), 'a', (aa), 'h\_rm'))$$

$$= \text{weight} * ((N((er), 'a', 'h\_rm') - \Sigma_{i \cdot (er)} N_{proposed}((er), 'a', i, 'h\_rm'))$$

$$-N_{proposed}((er), 'a', (aa), 'h\_rm')) \leq \text{weight} * ((N((er), 'a', 'h\_rm') - N_{proposed}((er), 'a' (aa), 'h\_rm'))$$

$$-N_{proposed}((er), 'a', (aa), 'h\_rm')) = \text{weight} * (N((er), 'a', 'h\_rm') - 2N_{proposed}((er), 'a', (aa), 'h\_rm')) \quad (4.1)$$

where N(phon, letter, $\text{phon}_{target}$, context) is the number of occurrences that phon should be $\text{phon}_{target}$ is aligned with letter in context, N(phone, letter, context) is the number of occurrences that phon is aligned with letter in context, and $N_{proposed}$(phon, letter, $\text{phon}_{target}$, context) is the number of times the rule "change phon to $\text{phon}_{target}$ if it is aligned with letter in context context" was proposed. Weight is a scalar that denotes the significance of the transformation, and it is there because not all editing transformation types (substitution, stress change, deletion, or insertion) are equally significant in the scoring function. A lower bound on the change in the error in (4.1) is $$\Delta\text{error} > -\text{weight} * N_{proposed}((er), 'a', (aa), 'h\_rm').$$

As seen in equation (4.1), one needs to keep track of only the contextual frequencies and the number of time each rule was proposed. While this is a large amount of information (about 100–500 MBytes for 3000 words with 3 context length), it does significantly speed up the rule search.

At each step of the learning process, the rule that improves the score the most is selected. If there are several rules that cause the same improvement, the one that is more general (uses smaller context, uses phoneme context as opposed to grapheme context, etc.) is chosen. Also, a rule is not applied if it was applied once before because doing so could cause infinite rule sequences if the rule gets re-proposed. To understand why this could happen, it is important to see that when the effectiveness of a rule is evaluated, it is done in the context of the current alignment. Once, the rule is applied, the words get rescored; thus, the alignments might change.

The scoring of the proposed pronunciations is done using a dynamic aligner 29 that aligns each proposed pronunciation with the true pronunciation. The complexity of the aligner 29 is $O(N^4)$ where N is the number of phonemes in the pronunciation (more precisely it is $O(N^2_{proposed} N^2_{correct})$, where $N_{proposed}$ and $N_{correct}$ are the lengths of the proposed and the correct pronunciations respectively).

The error between the pronunciations is the weighed string edit distance:

$$\text{Error} = w_{delete} * N_{delete} + w_{insert} * N_{insert} + w_{sub} * N_{sub} + w_{stress} * N_{stress}, \quad (4.3)$$

where $N_{delete}$, $N_{insert}$, $N_{sub}$, and $N_{stress}$ are the number of phoneme deletions, insertions, substitution, and stress changes required respectively, and $w_{delete}$, $w_{insert}$, $w_{sub}$, and $w_{stress}$ are the corresponding penalties for each mistake.

The rule applier 15 uses the alignment achieved during the scoring process to propose corrective transformations; therefore, it is important that the proposed and true pronunciations are aligned intelligently, especially if the difference is large. In the present system, insertions, deletions, and substitutions are weighed the same way; therefore, it is possible that there are several alignments with equal error. Consider the alignments between (sh hh 'ow z) and (sh 'ow w z) in FIG. 18.

The proposed rules for alignment B,

Delete (hh) (aligned with $l_1$) in context (sh_ _'ow). Insert (w) in context ('ow _ _z)

seem more viable than the rules proposed for alignment A:

Change (hh) (aligned with $l_1$) to ('ow) in context (sh _ _'ow).

Change ('ow) (aligned with $l_2$) to (w) in context (hh_ _z).

Therefore, the scoring function is augmented for the dynamic alignment process with weighed phonetic distances. Weights are assigned to each feature deemed important, and the distances in feature space as an error are added to the phoneme substitution penalties. Nevertheless, this additional score was weighed significantly less than the edit distance. Moreover, to speed up distance calculations, the negative dot product of the individual feature vectors was used instead of the absolute distance. As expected, adding this corrective term has significantly improved the overall score of the learner, since the proposed rules became more uniform; thus, the system, found the more significant rules earlier.

Rules are applied in a straightforward manner in the rule applier 15. For substitutions and deletions a check is made to determine if there is a phoneme that satisfies the contextual requirements (is aligned to the specified grapheme and has the specified phoneme or grapheme context). If there is, the phoneme is simply changed for substitutions, or removed for deletions.

If the transformation is an insertion, a check is made to determine if the specific context is in the word, and if it is, we insert the phoneme. Insertion is a more complicated procedure because one has to maintain correspondence between graphemes and phonemes throughout the learning process. For insertions this means that one has to instantiate a reasonable correspondence between the newly inserted phoneme and a grapheme. If the context was a grapheme context, the inserted phoneme will be assigned to the grapheme on the right, except when the insertion was at the end of the word. In that case the phoneme is assigned to the last letter. If the context was a phoneme context, one assigns the phoneme to the grapheme which is halfway between the graphemes assigned to the neighboring phonemes. If the insertion is at one of the ends of the word, the phoneme is assigned to the grapheme on the edge. The insertion process is illustrated by FIG. 19.

Rule application is done from left to right. This means that if a rule can apply at several places in a word, it will be first fully applied at the leftmost position. This could potentially result in infinite application of a rule, if the rule creates a new context to the right, where it could apply again. These loops are detected and avoided by the system, so that such rules will only execute once in a single context. Nevertheless, it is possible that they can apply at two or more separate contexts in the same word (FIG. 20).

There are several optimization techniques incorporated to speed up rule finding and rule application. Rule finding is based on the alignment information produced during the scoring process. A dynamic aligner is used. It is the fastest available method for the scoring.

The proposed transformations based on their usefulness is ranked, which is calculated from contextual and rule frequencies. To quickly access rules and contextual information, they are stored in a hash table. Rules, furthermore, are also accessible in the order of decreasing frequency (number of times they were proposed), so that when the effectiveness of rules are compared, one can ignore the rules that cannot potentially be more effective than the 'current winner' (based on equation (4.2). With these optimizations, evaluating a potential rule can be done in constant time.

Also, it is not necessary to rescore and recompute contextual frequencies every time a new rule is to be found. Since rules apply only to a limited number of words, it is sufficient to rescore only the words that were affected by the previous rule. This has significant effects on the run-time performance, since late rules tend to apply to only a couple of words. The contextual frequencies can also be updated incrementally, since they only change at words where the previous rule was applied.

Rule application can also be sped up by storing which context appears at which words, so that when one looks for a context to apply a rule, one only needs to look at the words that actually have that context. This has a significant effect on the speed of rule applications, since late rules only apply to a couple of words, and thus, there is no need to check all the words for the rule context.

While the learning process requires a large amount of information, the pronunciation rules 21 are captured by a small fraction of that information. The only information needed to store are the the initial phoneme sequences for the letters, and the transformational rules.

Nevertheless, for debugging and recovery purposes the state of the system is saved at every step, and also saved some additional information about each rule (where it applied, why it was proposed, and how it improved the score) for the purposes of debugging and reasoning.

One important detail is that the phoneme names in the learner 13 are different from the names used by the pronunciation generator because of phoneme renaming. Also, the phoneme extensions mentioned previously are encoded differently on the rule-application side because the rule applier 15 does not have all the information that the learner 13 has.

Word pronunciations are generated in a straightforward way. At first, an initial pronunciation is produced by transcribing each letter. Then, the transformation rules are applied one after the other. The resulting pronunciation is proposed as the pronunciation for the word.

The information that is needed for generating word pronunciations are the initial phoneme sequences for the letters, and the transformational rules.

This information (referred to as pronunciation information) is saved by the learner 13 in a format convenient for the rule applier 15.

Before rule application begins, the generator produces a preliminary pronunciation by concatenating the phoneme sequences corresponding to each letter in the word.

There are some potential issues, such as what to do with upper/lowercase letters, and what to do with letters not in the pronunciation information.

The problem with the case of the letters is resolved by introducing a case sensitivity flag in the rule applier 15. If it is on, the letters are case sensitive. If it is off, the pronunciation generator first tries to find a transcription for the given case of the letter, and if it fails, it tries the opposite case. This way, it is still possible to give case sensitive initial transcriptions for letters.

It was decided to simply produce no transcription for letters not specified by the pronunciation information. One could have removed these letters from the word as well, but that might have some disadvantages. The decision to produce no transcription is based on the expectation that the current system will not need to handle characters that are not transcribed by the pronunciation information.

Figure 21:
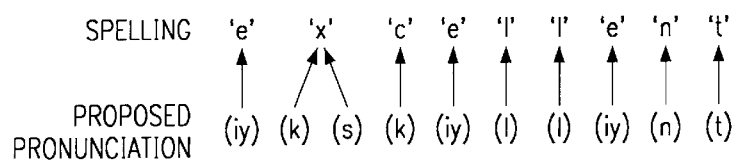
FIG. 21 illustrates the alignment used by the rule applier.

The data structure used during the rule-application process is similar to the one used during learning, except that it has only two layers (FIG. 21). Phonemes are initially assigned to the letters that instantiated them.

Rule application is equivalent to the rule application during the learning process. The pronunciation generator checks whether the rule applies to the current pronunciation guess. If it does (the rule context is present), the transformation is performed. Deletions and substitutions are straightforward, while insertions follow the same guidelines outlined previously. Rules again are applied from left to right, and rules that could potentially result in infinite application are detected and applied only once in a single context.

There is a simple optimization performed during the rule-application process. In order to eliminate checking the context for a rule that cannot potentially apply in a word, it is checked to determine if the word has all the letters that are referenced in the rule. A letter bitmask is calculated for each rule and the word, and a rule can only apply if the bitmask for the word completely contains the bitmask of the rule. This approach produced a three-times performance gain.

Further optimizations would have been possible by converting the rules into a finite state transducer, but the implications on the memory requirements prevented us from doing so. With more memory one could have also speed up context matching in a word.

Once the generator has tried to apply every rule, it concatenates the phonemes in the proposed pronunciation into a single pronunciation string. Although pronunciations are encoded as directed graphs in the recognizer, the time it took to parse the strings and produce these directed graphs was negligible.

There are several improvements that were considered for the system. First, the system—as it is—can only produce a single pronunciation for a word, while a system to produce multiple pronunciations is desired.

Multiple pronunciations are represented with an acyclic directed graph; thus, the straightforward approach would be to use graph transformations as rule templates. Unfortunately, it is difficult to score proposed graphs in an intelligent way. The problem is not that it is hard to figure out how well the proposed pronunciations match the correct pronunciation(s), but that it is hard to score the proposed graphs by aligning them with the correct pronunciation graphs. This alignment is needed because the rule proposition is data-driven, and it is important that the scoring function can suggest rules that bring the pronunciations closer to the truth. Finding such a scoring function is not straightforward, especially considering the fact that several pronunciation graphs can encode the same pronunciations.

To get closer to the goal, the word pronunciations were examined and it was discovered that multiple pronunciations in many cases arise simply by having phoneme variants in the pronunciation, such as 'more'_('mow(r_•er)), or 'hold'_('how[l]d).

These variants (referred to as compound phonemes in the rest of the document) encode either an optional phoneme, or a choice between two possible phonemes. If we encode these variants as phonemes themselves, the current learner can be used without any modification.

To illustrate the importance of using compound phonemes, the words in our English pronunciation dictionary were categorized, and found that only 58.3% of the words have one pronunciation. There are compound phonemes in 21.3% of the corpus, and for a large percentage of them (13.9% of the corpus) the resulting pronunciation after encoding becomes a single pronunciation. Therefore, 72.2% of the English pronunciation corpus can be used using compound phonemes in the pronunciation learner 13. Unfortunately, compound phonemes cannot simplify 20.4% of the English pronunciation corpus, mostly because the pronunciations vary in more than one phoneme at a time, e.g.

'abacus'→(' ae b · ah / . ah b ' ae) k .ah s),
or include varying stress, such as
'greenville'→(g r ' iy n v (, ih | . ah) l).

In 4.4% of the corpus the difference is only the stress of a syllable, e.g.

'marks up'→(('1 .) m aa r k s ' ah p).

With a script we found and transcribed the compound phonemes into special symbols and using phoneme renaming, we renamed them into their original form for the pronunciation generator. We could even assign feature values for the compound phonemes. The feature set of such phonemes were composed of the common features of the individual phoneme components.

Unfortunately, this solution still cannot handle variants with more than two phonemes, or variants involving phoneme sequences. Another problem is that the stress information is included in the phonemes, and therefore, compound phonemes involving vowels with different stress values (, ow | ' ow) or (, er | . er) cannot be combined.

Still, using compound phonemes allows one to train on more words. In fact, without compound phonemes, one completely misses examples for many important pronunciation phenomena; for example, one misses all examples of words ending in 're', such as 'more', 'dare', etc.

One possible solution to the problem of not being able to include every word in the training set is the following. For words whose pronunciations cannot be reduced to one single pronunciation using compound phonemes, we include only one (or several) of the possible pronunciations. This inevitably introduces ambiguity into the training set because we are training on a non-deterministic training set where the pronunciation of structurally similar words may capture several different pronunciation phenomena. This may result in competing pronunciation rules, of which none are selected because they cannot be combined with each other. Nonetheless, it exposes the learner to virtually all pronunciation phenomena in the language; therefore, there is a chance for higher accuracy.

Also investigated was the use of features to generalize pronunciation rules. Transformation rules in phonology textbooks often use phonetic features for context description, as in the rule $$\text{Change } (s) \text{ to } (z) \text{ in context} \left( \begin{bmatrix} \text{voiced} \\ \text{consonant} \end{bmatrix} \_\_ \right). \quad (4.4)$$

If we extended our notion of phonemes to include feature bundles, which could potentially stand for multiple phonemes, we could use our learner to discover such general rules. To examine the possibilities, we introduced new pseudo-phonemes described by their feature set. These feature-phonemes (also referred to as feature-groups) can map to any phoneme that matches all of their features. To allow the use of feature-phonemes we need to modify our system at two places.

When the learner proposes rules to correct mistakes, the rules are expanded so that all equivalent rules using feature-phonemes are also proposed. To do this, we need to substitute the phonemes in the rule with feature groups that can stand for the given phoneme. We need to do these substitutions in all possible ways, and propose each resulting rule.

Suppose, for example, that we only have two features +voice/–voice (+v/–v) and vowel/consonant (V/C). If the following rule is proposed Change (s) to (z) in context (d__), these rules would also be proposed due to the rule expansion
1. Change ([C]) to (z) in context (d__)
2. Change ([-v]) to (z) in context (d__)
3. Change ([-v C]) to (z) in context (d__)

4. Change (s) to (z) in context ([+v]_)
5. Change ([C]) to (z) in context ([+v]_)
6. Change ([-v]) to (z) in context ([+v]_)
7. Change ([-v C]) to (z) in context ([+v]_)
8. Change (s) to (z) in context ([C]_)
9. Change ([C]) to (z) in context ([C]_)
10. Change ([-v]) to (z) in context ([C]_)
11. Change ([-v C]) to (z) in context ([C]_)
12. Change (s) to (z) in context ([+v C]_)
13. Change ([C]) to (z) in context ([+v C]_)
14. Change ([-v]) to (z) in context ([+v C]_)
15. Change ([-v C]) to (z) in context ([+v C]_)

Note that rule 12 is the same as rule (4.4). Nevertheless, this approach still cannot represent phonetic rules, like $$\begin{bmatrix} -\text{voice} \\ \text{consonant} \end{bmatrix} \rightarrow [+\text{voice}] \begin{bmatrix} +\text{voice} \\ \text{consonant} \end{bmatrix} \quad (4.5)$$

Another disadvantage of this approach is that the memory requirements for keeping the contextual frequencies explode with the number of features.

$$O(\text{Mem}_{required}) = O(\Sigma_i \text{length}(word_i) * (2^N \text{features}) \text{length}_{context}) \quad (4.6)$$

A similar explosion happens with the execution time. Due to these problems, it would be preferable if rules could be generalized as a post-processing step, where we combined several rules into one general observation. Unfortunately, combining rules can potentially interfere with subsequent rules, and is therefore risky. One could, nevertheless, store which rules apply to which words and use this information to estimate the effect of a rule generalization.

Another approach would be to examine possible rule generalizations during the learning process, and if a plausible generalization comes up, one could revert the learner to the state where a general rule could be applied, and continue learning from that point. Due to time constraints, Applicants did not investigate these approaches; nevertheless, they are certainly worth looking at in the future.

The performance of our text-to-pronunciation system was evaluated in two steps. First, the contributions of various system parameters were examined. Then, the fine-tuned system's performance was compared to two existing text-to-pronunciation systems.

The performance of the system using English word pronunciations was measured. During the test runs, the learner 13 was trained on various training sets, with different configurations. A separate test set was used to evaluate the performance of the system. Since the system could generate multiple pronunciations, the following quantities were measured:

Phoneme error rates:
  minimum error: the difference between the closest pronunciations among the correct and generated pronunciations.
  average error: the average difference between the individual pronunciations of the correct and generate pronunciations.

Word error rates:
  exact generation: the number of words for which the generated pronunciation(s) exactly matched the correct pronunciation(s).
  maximal word accuracy: the number of words for which at least one generated word was correct.

average word accuracy: average percentage of correct word pronunciations.

undergeneration: the number of words for which there were some correct pronunciations that were not generated by the system.

overgeneration: the number of words for which the system generated pronunciations that were incorrect. The compliment of this quantity is the measure that all pronunciations generated were correct, which—for words with one generated pronunciations—equals to the word accuracy.

During the evaluation of the system parameters, we also measured the number of rules generated,
  the phoneme and word accuracy for the training set,
  the average number of generated pronunciations per word, and
  the percentage of words that at least one rule was applied to (application percentage).

For the general evaluation of our learning method, and to fine-tune our system, the effects of various system parameters on the learning performance was examined. In particular, the effects of case sensitivity, initial guesses, dynamic versus static alignments during learning, context size, amount of phonetic information in the phoneme-phoneme alignment, and the use of features and compound phonemes was examined.

A 1000-word, randomly selected training set was used containing either words with one pronunciation, or words having only one pronunciation using compound phonemes.

TABLE 3

Effects of case sensitivity during rule application and initial guesses

| Case Sensitivity | | Training Set | | Test Set | | |
| --- | --- | --- | --- | --- | --- | --- |
| Initial Guesses | Rule Application | Word Accuracy | Phoneme Accuracy | Exact Words | Word Accuracy | Phoneme Accuracy |
| No | No | 49.4 | 86.5 | 21.3 | 26.3 | 76.9 |
| No | Yes | N/A | N/A | 21.1 | 26.3 | 77.0 |
| Yes | No | N/A | N/A | 21.1 | 26.1 | 76.8 |
| Yes | Yes | 49.5 | 86.6 | 21.1 | 26.1 | 76.7 |

The test set was the same for all of the test cases, and it contained 5000 randomly selected words. The training and test sets had no common elements. Stress was also ignored for the evaluation; nonetheless, schwas were separated from the rest of the vowels using separate phoneme names. The results for the different test runs are summarized in FIG. 22.

The learner 13 is capable of deriving pronunciation rules both case-sensitively or case-insensitively. The main reason for this option was that in many languages capitalization does not influence the pronunciation of words. However, some languages can rely on case for pronunciation; therefore, we did not want to rule out the importance of case.

The rule applier can also treat pronunciation rules or initial pronunciation guesses case sensitively. As mentioned previously, it is possible to give initial pronunciations for letters of either case. If the initial guesses are case insensitive, the rule applier will look at each letter, and for letters that do not have an initial pronunciation associated in their proper case, it will use the initial pronunciation for the opposite case. Case sensitivity during rule application means that the graphemes in the rule contexts and the words are matched case sensitively.

As seen in Table 3, case sensitivity has minimal influence on the learning performance in English. Nevertheless, it is shown that it is not advised to use case sensitive initial guesses. On the contrary, case sensitivity during rule application slightly improves phoneme accuracy, although it lowers the number of exact word pronunciations.

TABLE 4

Effects of allowed empty initial guesses

| Initial guesses | # of rules | Training Set | | Application Percentage | Test Set | | |
|---|---|---|---|---|---|---|---|
| | | Word accur. | Phon. accur. | | Exact words | Word accur. | Phon. accur. |
| Can be empty | 449 | 85.3 | 43.8 | 94.1 | 16.5 | 20.0 | 73.9 |
| Non-empty | 337 | 86.5 | 49.4 | 96.1 | 21.3 | 26.3 | 76.9 |

The effect of allowing or disallowing empty initial pronunciation sequences in the learning system was examined. In some cases, empty sequences are more probable in phoneme-grapheme alignments than non-empty ones. For example, in English the following letters have highly probable empty transcriptions:

| Grapheme | Empty sequence probability | Best non-empty phoneme sequence | Probability |
|---|---|---|---|
| ' ' | 1.00 | ∅ | N/A |
| ',' | 0.97 | (.ah) | 0.02 |
| 'e' | 0.57 | ('eh) | 0.13 |
| 'g' | 0.52 | (g) | 0.32 |
| 'h' | 0.71 | (hh) | 0.21 |
| 'o' | 0.20 | (.ah) | 0.16 |
| 'u' | 0.35 | ('ah) | 0.30 |

As shown on Table 4, allowing empty initial sequences results in more rules. This is because the learner needs to insert the omitted phonemes into the words. In fact, the learner has generated rules to insert; the missing phonemes fairly early:

8. Insert (hh) in context '$_h'

15. Insert (g) in context '$g_'

In addition, even though more rules are generated, they apply to fewer words in the rule application process. The performance of the system significantly dropped when the empty initial phoneme sequences was allowed. Therefore, we disallowed empty initial sequences in our learning processes.

TABLE 5

Effects of different alignment schemes during learning

| Grapheme-phoneme alignment | Test set | | |
|---|---|---|---|
| | Exact words | Word accuracy | Phoneme accuracy |
| Initial, then true alignment | 21.3 | 26.3 | 76.9 |
| Always true alignment | 21.3 | 26.4 | 77.1 |

Previously, it was discussed that the true pronunciations are aligned with the spelling during the learning process. When the proposed pronunciation approaches the truth, these true alignments are used—as opposed to the initial alignments—to match phonemes with graphemes. Note, that this also means that rules will be proposed using the new alignments and not the alignments derived from the initial alignments. On the other hand, when the pronunciations are generated, rules will be applied to the initial alignments, or the alignments that are subsequently derived from them when rules are applied. This might result in a context mismatch, and a consequent performance loss, because rules are applied in a different context than what they were proposed in. However, we expect a performance gain because the true alignments are more systematic, and less prone to random variations in the initial alignments. Thus, it was examined how the system performance changes if the true alignments are used from the start.

As seen in Table 5, the system's performance slightly improves if we use the true alignments from the beginning. Therefore, true alignments are used in the subsequent performance tests.

It also was examined how the amount of phonetic information during phoneme-phoneme alignment influences the performance of the learner. Several tests were run with various amounts of phonetic information, including voicing (v), place of articulation (p), vowel height (h), vowel position (f), consonant quality (s: stop, fricative, etc.), roundedness (r), nasal quality (n), and category (c: diphthong, syllabic, etc.) attributes. The vowel/consonant distinction is inherent in the system, so we do not list that information.

The overall result of the tests (Table 6) showed that while some information (v, h, f) improves the performance of the learner, certain phonetic information is detrimental to the system (s, n, c, r). To highlight this observation, the system's performance using only these features (s, n, c, r) is worse than when using no information at all.

TABLE 6

Effects of various phoneme information during phoneme–phoneme alignment

| Phonetic information | Training set | | Test set | | |
|---|---|---|---|---|---|
| | Word accuracy | Phoneme accuracy | Exact words | Word accuracy | Phoneme accuracy |
| none | 42.1 | 83.8 | 17.3 | 21.6 | 74.0 |
| v, p | 49.3 | 86.6 | 20.4 | 25.2 | 76.3 |
| v, f | 50.1 | 86.9 | 21.4 | 26.4 | 77.0 |
| v, f, h | 49.5 | 86.7 | 21.5 | 26.8 | 77.3 |
| v, f, h, p | 52.1 | 87.8 | 22.1 | 27.5 | 77.8 |
| v, f, h, p, s, n, c, r | 49.9 | 86.6 | 21.2 | 26.1 | 76.9 |

TABLE 6-continued

Effects of various phoneme information during phoneme–phoneme alignment

| | Training set | | Test set | | |
|---|---|---|---|---|---|
| Phonetic information | Word accuracy | Phoneme accuracy | Exact words | Word accuracy | Phoneme accuracy |
| v, f, h, p, s, r | 49.5 | 86.6 | 21.3 | 26.4 | 77.1 |
| s, c, n, r | 42.1 | 83.8 | 17.3 | 21.5 | 73.9 |

The performance gain from using compound phonemes was examined. The learned pronunciations from a training set of 1000 words with one pronunciation was contrasted with ones learned from a training set of 1000 words having only one pronunciation using compound phonemes. Table 7 shows the performance of the system with the two training sets. It seems that the performance on the training set decreases if compound phonemes is used. However, it is important to see that contrary to the previous test cases, the words in the two training sets belong to different word categories. Therefore, the decreased performance during the learning stage is not significant. In fact, rules learned with the compound phonemes improved the application percentage, and the phoneme accuracy.

TABLE 7

Effects of compound phonemes

| | | Training Set | | | | Test Set | | |
|---|---|---|---|---|---|---|---|---|
| Phoneme set | # of rules | word acc. | Phon. acc. | Appl. perc. | Aver. Pron. | Exact words | Word acc. | Phon. Acc. |
| Regular | 381 | 49.5 | 86.6 | 96.1 | 1 | 21.3 | 26.4 | 77.1 |
| Compound | 432 | 42.4 | 84.3 | 96.7 | 1.06 | 20.3 | 25.2 | 78.1 |

Note, that the word accuracy decreased with compound phonemes. Nevertheless, one must not neglect the fact that compound phonemes allow us to use a wider range of words in the training set, and thus the learner is able to learn and generate a larger set of pronunciation phenomena, including ones observed in some of the most common words.

As expected, larger context length gives better performance. However, training with large context sizes is prone to overlearning, in which case the system merely memorizes the training set. This happened in our experiment at maximal context size of three (see Table 8), which had a lower performance than the run of context size two.

Figure 23:
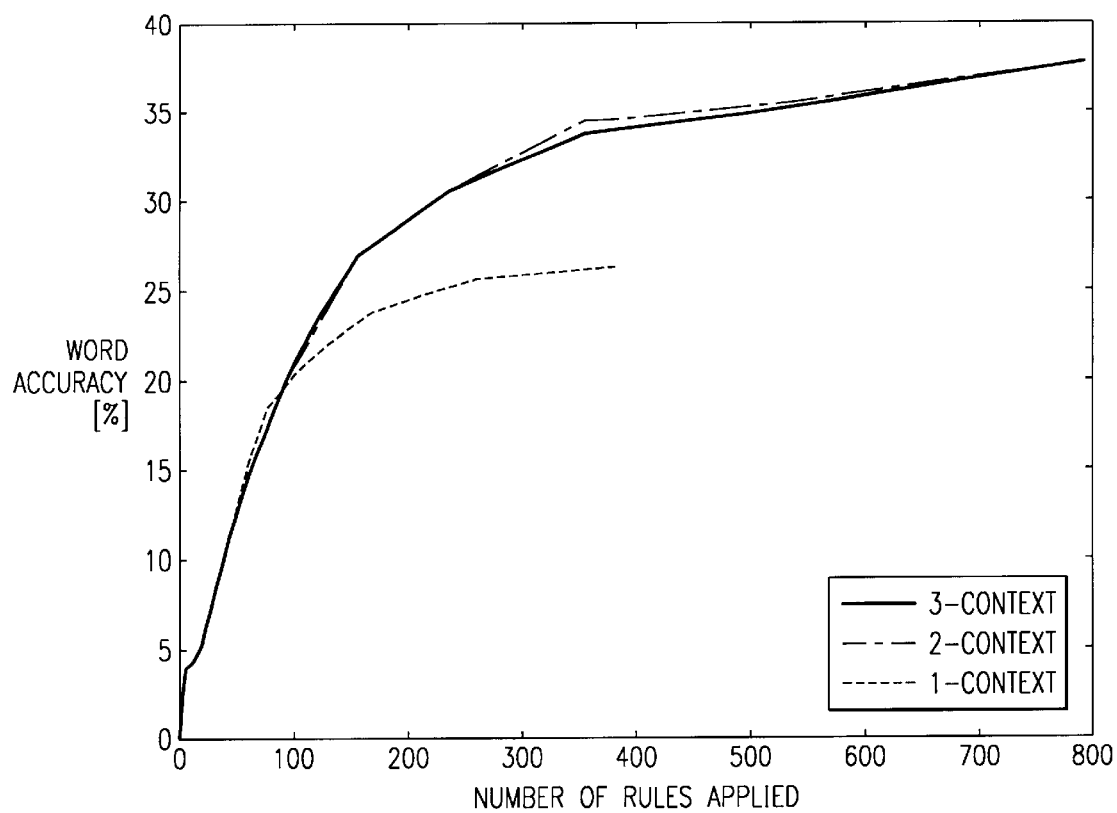
FIG. 23 illustrates word correctness rate, depending on the context size and the number of rules applied.

The overlearning is supported by the fact that although there were more 3-context rules than 2-context ones, they applied to fewer words, suggesting that more of the 3-context rules were specific to the training set. FIG. 23 illustrates the goodness of the rules from runs of various context lengths. It shows the word accuracy achieved by the first N rules learned in the three runs. As seen, after the first 250 rules, 2-context rules consistently outperform 3-context rules.

Note also, that 1-context rules overperform the higher context ones up until about eighty rules. This illustrates that choosing the most corrective rule does not give optimal performance, as higher-context rules could generate all 1-context rules, but still have lower performance in that region.

TABLE 8

Effects of context size on the performance

| | | Training Set | | | Test Set | | |
|---|---|---|---|---|---|---|---|
| Context size | # of rules | word acc. | Phon. acc. | Appl. perc. | Exact Words | Word Acc. | Phon. Acc. |
| 1 | 381 | 49.5 | 86.6 | 96.1 | 21.3 | 26.4 | 77.1 |
| 2 | 784 | 97.7 | 99.6 | 98.0 | 30.8 | 38.2 | 82.9 |
| 3 | 792 | 99.7 | 100.0 | 97.7 | 30.7 | 38.2 | 82.8 |

Simple experiments were run using feature-phonemes of different sets of phonetic features. It was generally found that the use of feature-phonemes reduces the number of rules; therefore, the learner does indeed make generalizations based on features. However, the usefulness of features is questionable. While increasing the set of features improved the performance for the 1-context case, it generally decreased the performance for the 2-context case (Table 9).

Another interesting detail is that the learned rules applied to the same number of words using features as without them. This could signal that real generalizations did not actually take place. Nevertheless, our experiments with features are preliminary, as the time and memory requirements of the system prevented us to allow a larger set of phonetic features. Therefore, a separate investigation is necessary to determine if using feature-phonemes in the transformation-based learner is useful.

TABLE 9

Effects of using feature-phonemes

| | | | Training Set | | | Test Set | | |
|---|---|---|---|---|---|---|---|---|
| Context size | Features Used | # of rules | Word acc. | Phon. acc. | Appl. Perc. | Exact words | Word acc. | Phon. Acc. |
| 1 | none | 381 | 49.5 | 86.6 | 96.1 | 21.3 | 26.4 | 77.1 |
| 1 | voice | 362 | 49.1 | 86.5 | 96.2 | 21.0 | 26.7 | 77.1 |
| 1 | V/C | 375 | 51.4 | 87.0 | 96.1 | 21.9 | 27.1 | 76.9 |
| 1 | V/C, voice | 371 | 51.4 | 87.0 | 96.1 | 22.2 | 27.2 | 76.7 |
| 2 | none | 784 | 97.7 | 99.6 | 98.0 | 30.8 | 38.2 | 82.9 |
| 2 | V/C | 712 | 97.7 | 99.6 | 98.1 | 30.5 | 37.7 | 81.9 |
| 2 | V/C, voice | 697 | 97.8 | 99.6 | 98.0 | 29.9 | 37.0 | 81.0 |

In the second part of the performance evaluation, the system's performance was compared to two other systems. As before, there was no differentiation between vowels with different stress levels, but treated schwas and regular vowels separately. A maximal context length of three was used, and the training set was selected from the words that could be transcribed in a way—using compound phonemes—that they had one pronunciation. The test set was selected randomly among all words in the dictionary, including words that the pronunciation generator would theoretically not be able to generate.

First, the system was compared to dmakeup, a context-based system used at Texas Instruments' Speech Recognition Group, which was built similarly to ARPA's approach described previously. Table 10 shows the results of the comparison. The pronunciation learner outperformed the simple context-based system in every case. Note, however, that the number of rules for our system is significantly higher than that for the simple

TABLE 10

Performance of the system compared to a simple rule based system (dmakeup)

| System | TTP | TTP | TTP | TTP | dmakeup[1] |
|---|---|---|---|---|---|
| training set | 1K (compound) | 2K (compound) | 5K (compound) | 10K (compound) | N/A |
| test set | 10K (any) | 10K (any) | 10K (any) | 10K (any) | 10K (any) |
| exact generation | 33.5% | 44.9% | 62.6% | 73.9% | 19.8% |
| under generation | 65.8% | 54.0% | 36.7% | 25.6% | 80.2% |
| over generation | 60.3% | 48.6% | 30.2% | 18.7% | 72.2% |
| minimum phon. error | 16.9% | 12.7% | 7.5% | 4.5% | 23.6% |
| average phon. error | 17.1% | 13.1% | 7.7% | 4.7% | 23.6% |
| execution time | 1.61 ms | 2.72 ms | 4.18 ms | 5.76 ms | 100 µs |
| number of rules | 1061 | 1721 | 2890 | 4082 | 300 | system. This, and the complexity of our rules, results in a much higher pronunciation-generation time.

The system was compared to Picone's neural network based system. Picone's system was trained on proper names using neural networks with different number of layers. The system according to the present invention has better performance than the neural network based system on each test set (Table 11).

TABLE 11

Performance of our system compared to a neural network approach

| System | TTP | TTP | TTP | NN | NN | NN |
|---|---|---|---|---|---|---|
| training set | 15K (names) | 15K (names) | 15K (names) | 15K (names) | 15K (names) | 15K (names) |
| test set | 3.5K (names) | 3.5K (names) | 3.5K (names) | 3.5K (names) | 3.5K (names) | 3.5K (names) |
| has correct generation | 61% | 69.6% | 68.6% | 33.1% | 33.1% | 33.1% |
| minimum phoneme error | 7.3% | 7.1% | 7.5% | N/A | N/A | N/A |
| average phoneme error | 8.0% | 7.9% | 8.2% | N/A | N/A | N/A |
| number of rules | 6594 | 6667 | 6619 | 300 neurons | 300 neurons | 300 neurons |

The transformation-based error-driven learner outperformed both systems. When evaluating the system, we observed the general tendencies of learning processes. The more information we gave to the system, the better performance it had. These were the tendencies that we discovered in our system:

Larger context in the rule templates resulted in better pronunciation generation.

More phonetic information during learning resulted in rules with better performance.

Including more cases in the training corpus allowed to learn more pronunciation phenomena.

Larger training corpus exposed the learner to more examples for special cases.

One of the most important things learned is that the training set for an automated learner has to be carefully constructed. Throughout the training process we relied on a randomly selected training corpus. Later, when we examined the performance of the system, we realized that many of the radical rules (that caused the system to generate horrendous pronunciations for simple words) resulted because there was no example in the training corpus for common pronunciation rules used in common words. This happened mainly because we had to restrict our training set to words with one pronunciation, and most common words have a large number of pronunciations.

There are several work-arounds to this problem. One could, for example, randomly include just one of the pronunciations for words that have truly multiple pronunciations. This could possibly result, however, in contradicting examples for competing rules, which could cause the learner to abandon each of the rules involved.

It would also help to have a utility that checks whether the training corpus has all the interesting cases. If the utility found a context that is not represented in the training corpus, it could signal the user so that (s)he can evaluate the importance of the missing example. The utility could also recommend additions to the training set, or the removal of redundant examples.

Another observation was that rules at the late stages of the learning process tend to correct a specific "mistake" that relates to only one word. This means that in the late stage the learner memorizes pronunciations instead of learning pronunciation rules. We think that by the introduction of features this memorization could be greatly reduced. However, we need to find a way to include features without imposing impossible time or memory requirements on the system.

The performance of the system could be improved by using transformation-based error-driven learning as a post-processor to an existing text-to-pronunciation system. We chose not to do this, as our approach requires the alignment of phonemes and graphemes at rule application, which is a time consuming process. However, if the preceding system produced the alignment automatically, our system could be used without significant performance degradation.

One problem with data-driven rule suggestion is that if our data is not correctly aligned, we can suggest rules that do not make sense or decrease the score.

Currently, the sole purpose of the system is to produce a pronunciation for a word, given it has the pronunciation rules specific to the language. If we have pronunciation rules for several languages, the system could be augmented to be able to pronounce words based on rules for several languages. Using a language identification tool, the system could be extended to propose pronunciations automatically in the correct language. This would be especially useful when trying to recognize proper names, as some people utter names in their own native language, while others try to utter them in the original language of the proper name. One potential problem with this desired feature is that different languages have different phoneme sets, and the pronunciations generated under the rules of one language would need to be translated into the phonemes of the other language.

One could also use an unsupervised learner to discover pronunciations for languages without knowing the proper pronunciations for any word. If we know how letters can be pronounced, we can use an unsupervised learner to discover pronunciation rules. See, Eric Brill, *Unsupervised Learning of Disambiguation Rules for Part of Speech Tagging*, NATURAL LANGUAGE PROCESSING USING VERY LARGE CORPORA, Kluwer Academic Press, 1997. Probably this would only be useful to discover the general pronunciation rules for a language, as no special cases are marked. An unsupervised learner could also be used as a language identifier.

I claim:

1. A text-to-pronunciation system comprising: a large training set of word pronunciations, and means coupled to said large training set of word pronunciations for extracting language specific information from said large training set of word pronunciations to produce pronunciations for words not in said large training set of word pronunciations; said means includes a learner for creating pronunciation guesses for words in said large training set of word pronunciations and for finding a transformation rule that improves said word pronunciation guesses and a rule applier for applying said transformation rule found to improve said word pronunciation guesses.

2. The system of claim 1, wherein said learner finds other transformation rules that improve the pronunciation guesses and said rule applier applies said other transformation rules to find a transformation rule that improves the pronunciation guesses the most.

3. The system of claim 2, including a rule scorer for scoring pronunciation guesses based on the difference between the word pronunciation guesses and the word pronunciation in said large training set to produce a transformation rule score, and a rule selector for selection from the transformation rules the transformation rule that improves the score the most.

4. The system of claim 3, wherein said learner includes a slice algorithm with contrastive word pairs for finding initial approximations for the grapheme-phoneme conditional probabilities.

5. The system of claim 4, wherein said learner includes an aligner for after finding the initial approximations using the slice algorithm for finding more precise grapheme-phoneme conditional probabilities using iterative realignment of grapheme-phoneme and phoneme using said aligner.

6. The system of claim 2, wherein said learner includes a slice algorithm with contrastive word pairs for finding initial approximations for the grapheme-phoneme conditional probabilities.

7. The system of claim 6, wherein said learner includes an aligner for after finding the initial approximations using the slice algorithm for finding more precise grapheme-phoneme conditional probabilities using iterative realignment of grapheme-phoneme and phoneme using said aligner.

8. The system of claim 7, wherein said rule applier applies rules from left to right starting from the left most position and the phonemes are changed for substitution or removed for deletions if the phonemes are aligned to specific graphemes and have the specified phoneme or grapheme context.

9. The system of claim 8, wherein said rule applier applies a rule for an insertion wherein a check is made to determine if the specific context is in the word and if the context was a grapheme context, the inserted phoneme is assigned to the grapheme on the right except when the insertion is at the end of the word and in that case is assigned to the last letter and if the context is a phoneme context the phoneme is assigned to the grapheme which is halfway between the graphemes aligned to the neighboring phonemes and if the insertion is at one end of the ends of the word, the phoneme is assigned to the grapheme on the edge.

10. The system of claim 9, including a storage for storing initial phoneme queries for letters and the transformation rules.

11. The system of claim 1, wherein said learner expands the transformation rule using feature-phonemes, said feature-phonemes map to any phoneme such that when the learner proposes rules to correct mistakes the rules are expanded so that all equivalent rules using feature-phonemes are proposed.

12. The system of claim 11, wherein the phonemes in the rule are substituted with feature phonemes that stand for given phonemes and this substitution is done in all possible ways with proposed results.

13. The system of claim 1, wherein said learner includes means for compound phonemes which is a generalization of phonemes that enables having multiple pronunciations with a system that generates really one pronunciation.

14. The system of claim 13, wherein said compound phonemes encode either an optional phoneme, or a choice between two possible phonemes.

15. A method of text-to-pronunciation comprising the steps of:

providing a training set of pronunciations;

extracting language specific information from said training set of pronunciations;

generating grapheme-phoneme guesses for every word in said training set using said language specific information;

finding a transformation rule that improves said guesses; and applying said transformation rule to all guesses, finding another rule to all guesses and repeating said finding and applying steps to find the transformation rule that improves said guesses the most.

16. The method of claim 15, wherein said applying step includes enumerating every mismatch between word pronunciations in said training set and proposed pronunciations to produce a score representing the error between pronunciation and augmenting the scoring with weighted phonetic distances where weights are assigned to each feature deemed important and the distances in feature space as an error are added to the phoneme substitutional pennalties.

17. A method of text-to-pronunciation comprising the steps of:

learning pronunciation rules by finding initial approximations for the grapheme-phoneme conditional probabilities using a slice algorithm then finding more precise grapheme-phoneme conditional probabilities using iterative realignment of grapheme and phoneme sequences;

aligning individual phonemes with graphemes in a training set;

proposing initial word pronunciation guesses for each word;

finding transformations that bring proposed word pronunciations closer to word pronunciations in said training set by initially aligning phonemes with the letter for which the phonemes were generated, aligning proposed pronunciations guesses with word pronunciations in said training set as well as necessary corrections marked and finally aligning the word pronunciations in the training set with the spelling by aligning individual phonemes with graphemes in the words;

finding pronunciation rules that bring the proposed pronunciation guesses closer to the word pronunciations in the training set;

applying one of the rules found to get new word pronunciation guesses;

comparing proposed word pronunciation guesses by aligning them with the word pronunciations in the training set to find necessary phoneme insertions, deletions and substitutions and propose rules at each place where pronunciations deviate from each other;

scoring every mismatch between pronunciations in said training set and proposed pronunciation guesses to produce a score representing error;

ranking rules by how much the rules improve the score;

selecting the rules that improves the score the most;

applying rules whereby for substitutions the phoneme is changed and for deletions is removed if the phoneme is aligned to the specific grapheme and has the specified phoneme or grapheme context, for insertion the inserted phoneme is assigned to the grapheme on the right except when the insertion is at the end of a word if the specific context is in the word and the phoneme is assigned to the grapheme which is halfway between the grapheme aligned to the neighboring phonemes if the context was a phoneme context and if the insertion is at one of the ends of the word if the phoneme is assigned to grapheme at the edge;

storing the initial phoneme sequences for letters and the transformation rules; and generating word pronunciations by initially transcribing each letter and applying the transformation rules in sequence.

18. A method of text-to-pronunciation comprising the steps of:

learning pronunciation rules by finding initial approximations for the grapheme-phoneme conditional probabilities using a slice algorithm using contrastive word pairs;

finding more precise grapheme-phoneme conditional probabilities using iterative realignment of grapheme and phoneme sequences;

preparing for learning by aligning individual phonemes in a training set;

initializing for learning by proposing initial word pronunciation guesses for each word;

learning process to find transformations that bring proposed word pronunciation guesses closer to word pronunciations in said training set by initially aligning phonemes with the letter for which the phonemes are generated, aligning pronunciation guesses with word pronunciations in said training set as well as necessary corrections marked and finally aligning the word pronunciations in the training set with the spelling by aligning individual phonemes with graphemes in the words;

finding pronunciation rules using a data-driven approach that brings the proposed pronunciation guesses closer to the word pronunciations in the training set by looking for rules that bring proposed pronunciation guesses closer to the word pronunciations in the training set and then applying one of the rules found to get to new pronunciation guesses, the proposed pronunciation guesses are compared by aligning proposed solutions with the word pronunciations in the training set to find necessary phoneme insertions, deletions or substitutions and propose rules at each place where pronunciations deviate from each other to correct the mistake;

enumerating every mismatch between word pronunciations in the training set and proposed pronunciation guesses to produce a score representing the error between the pronunciations which is the weighted string distance using a dynamic aligner;

augmenting the scoring with weighted phonetic distances where weights are assigned to each feature deemed important and the distances in feature space as an error are added to the phoneme substitutional penalties;

ranking pronunciation rules by how much they improve the scores;

selecting the rule that improves the score the most and if several rules cause the same improvement select the one that uses smaller context and uses phoneme context as opposed to grapheme context, and a rule not applied once before;

applying rules going from left to right starting at the left most position and for substitutions and deletions the phoneme is changed for substitutions or removed for deletions if the phoneme is aligned to the specified grapheme and has the specified phoneme or grapheme context, and for insertion a check is made to determine if the specific context is in the word and if the context was a grapheme context, the inserted phoneme is assigned to the grapheme on the right except when the insertion is at the end of the word and in that case assigned to the last letter and if the context was a phoneme context the phoneme is assigned to the grapheme which is halfway between the graphemes aligned to the neighboring phonemes and if the insertion is at one end of the ends of the words, the phoneme is assigned to the grapheme on the edge;

storing the initial phoneme sequences for letters and the transformation rules; and generating word pronunciations by initially transcribing each letter and then applying the transformation rules in sequence.

* * * * *